(12) United States Patent
Kazama

(10) Patent No.: US 7,689,000 B2
(45) Date of Patent: Mar. 30, 2010

(54) IMAGE STORAGE DEVICE AND METHOD

(75) Inventor: Hisashi Kazama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 888 days.

(21) Appl. No.: 11/509,384

(22) Filed: Aug. 24, 2006

(65) Prior Publication Data

US 2007/0047843 A1    Mar. 1, 2007

(30) Foreign Application Priority Data

Aug. 25, 2005   (JP)   ............... 2005-244449

(51) Int. Cl.
*G06K 9/00* (2006.01)
(52) U.S. Cl. ................................. 382/103
(58) Field of Classification Search ........... 382/103
See application file for complete search history.

(56) References Cited

U.S. PATENT DOCUMENTS

| | | | | |
|---|---|---|---|---|
| 5,838,365 | A | * | 11/1998 | Sawasaki et al. ......... 348/169 |
| 6,438,165 | B2 | * | 8/2002 | Normile ................. 375/240 |
| 6,674,798 | B2 | * | 1/2004 | Ishihara et al. ....... 375/240.16 |
| 6,850,252 | B1 | * | 2/2005 | Hoffberg ............... 715/716 |
| 2001/0051516 | A1 | | 12/2001 | Nakamura et al. |

FOREIGN PATENT DOCUMENTS

| | | |
|---|---|---|
| JP | P2002-51300 A | 2/2002 |
| JP | P2002-149672 A | 5/2002 |
| JP | P2003-224791 A | 8/2003 |
| JP | P2004-21597 A | 1/2004 |
| JP | P2004-62883 A | 2/2004 |

* cited by examiner

*Primary Examiner*—Bhavesh M Mehta
*Assistant Examiner*—Dennis Rosario
(74) *Attorney, Agent, or Firm*—Sprinkle IP Law Gorup

(57) ABSTRACT

An image storage device according to an example of the invention comprising a first storage unit which stores first image, a second storage unit which stores second image to be determined whether the second image includes detection target data which is the similar to data included in the first image, parallel comparison units which perform a process of comparing pixel values between a frame of the first image and a frame of the second image, and determining, based on a comparison result between the frame of the first image and the frame of the second image, whether the detection target data is included in the second image in parallel, and a third storage unit which stores, when it is determined that the detection target data is included in the second image, the detection target data.

20 Claims, 12 Drawing Sheets

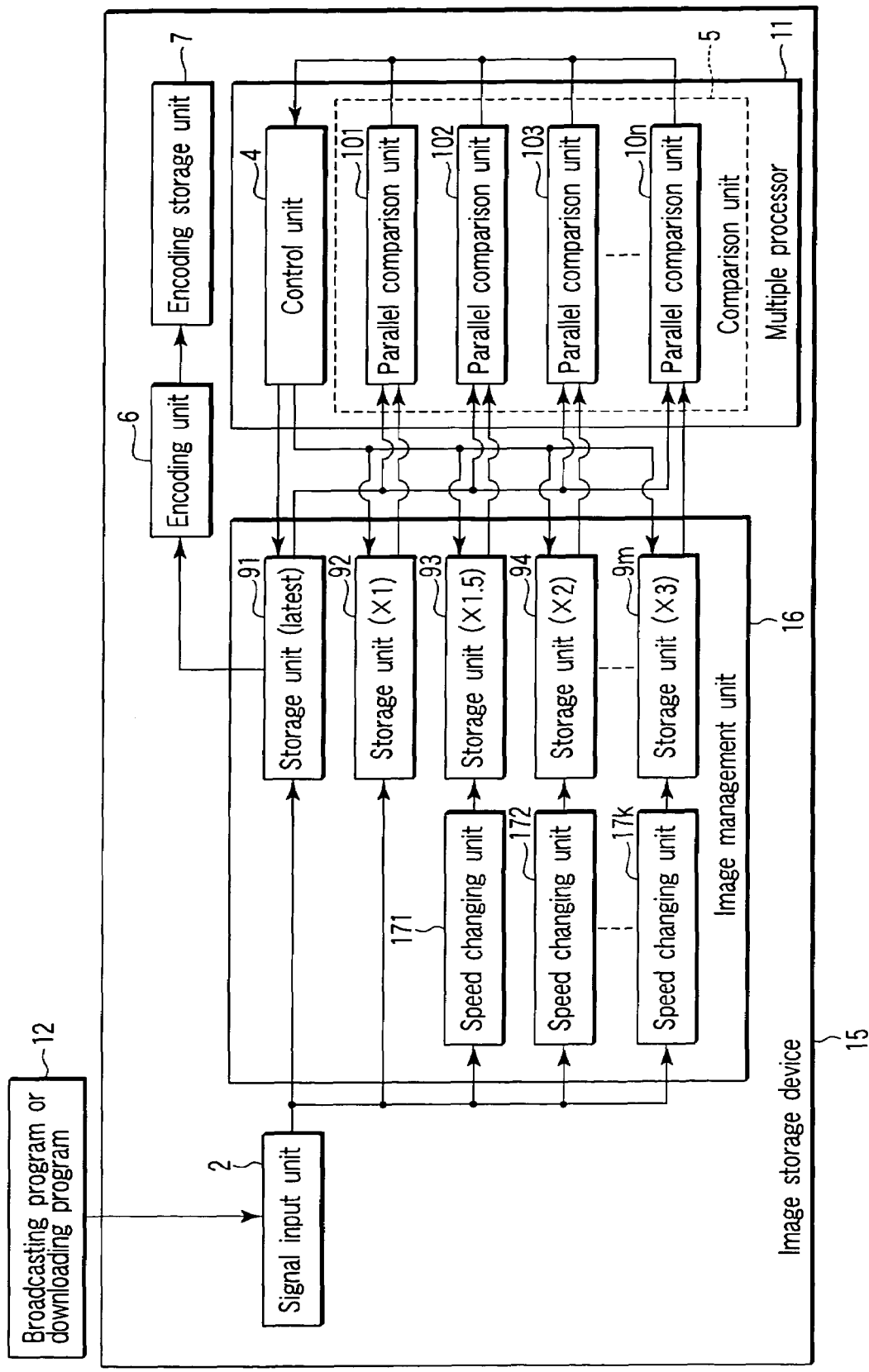
F I G. 5

IMAGE STORAGE DEVICE AND METHOD

CROSS-REFERENCE TO RELATED APPLICATIONS

This application is based upon and claims the benefit of priority from prior Japanese Patent Application No. 2005-244449, filed Aug. 25, 2005, the entire contents of which are incorporated herein by reference.

BACKGROUND OF THE INVENTION

1. Field of the Invention

The present invention relates to an image storage device and method.

2. Description of the Related Art

Patent document 1 (Jpn. Pat. Appln. KOKAI Publication No. 2002-149672), entitled "AV Content Automatic Summarization System and AV Content Automatic Summarization Method," discloses a method in which the content of a scene is grasped by using a sound recognition or image recognition technique and the grasped content is used for automatic recording of AV content or as a clue in searching for an image.

Patent document 2 (Jpn. Pat. Appln. KOKAI Publication No. 2004-62883), entitled "Information Processing Device," discloses a method in which by using a special device that is a sensor for measuring a user's eye movement, the user's interest is recognized and thereby a highlight scene is specified.

Patent document 3 (Jpn. Pat. Appln. KOKAI Publication No. 2003-224791), entitled "Video Search Method and Device," discloses a method in which feature values are extracted in advance from video which is a check target, a table of the feature values and times is created, and then a search is performed, whereby a replay is recognized.

The patent document 3 describes that using information that represents the average color of the entire frame image and the like by several bytes as the feature values, information that represents the average color of the entire frame image and the like by several bytes is used.

For video image searching, patent document 4 (Jpn. Pat. Appln. KOKAI Publication No. 2004-21597) discloses a device for searching a video image which completely matches a search target frame image.

Patent document 5 (Jpn. Pat. Appln. KOKAI Publication No. 2002-51300) discloses a method of performing edits after a highlight scene is detected.

In the method of the patent document 1, there are many candidates for a sound recognition algorithm or an image recognition algorithm, and thus the recognition accuracy of a scene varies depending on which algorithm is selected. In addition, variations occur in the functionality of a device that performs a recognition, depending on which sound recognition or image recognition technique is used. Furthermore, there are a recognizable scene and an unrecognizable scene depending on the sound recognition or image recognition technique, which may impair usability for a user.

In addition, the sound recognition or image recognition technique may perform a wrong recognition and thus misdetection or search omission of a scene may occur.

In the method of the patent document 1, since a data dependency in processing steps is high, the adoption of a multiple process is difficult and thus it is difficult to increase speed.

In the method of the patent document 1, since the workload varies depending on the properties of an image to be inputted, hardware design is difficult.

In the case of using the method of the patent document 1, it is difficult to develop a sound recognition algorithm or an image recognition algorithm having performance which satisfies the user.

When, as in the patent document 2, a highlight scene is specified by using a special sensor, it is a lot of trouble to operate the special sensor and only when the user is watching a scene, scene analysis and indexing process are performed.

For example, the telop characters "Replay" may be inserted in a replay scene, or the telop characters "CM" may be inserted in a screen. A replay may be performed in slow motion. In the patent document 3, a method of dealing with such processes on replay scenes is not considered. When a replay scene is processed, the feature values change and it becomes difficult to perform collation.

In the patent document 3, by selection of the feature values or algorithm used for recognition, the performance of recognition is affected.

In the patent document 3, image data is treated by the feature value. Thus, for example, when an algorithm for extracting the feature values is changed, e.g., when a new algorithm for extracting the feature values is updated to improve performance, there is a need to exclude past image data from a search target or to process all stored image data again with the changed algorithm for extracting the feature values.

The patent document 4 does not at all describe the extraction of a highlight scene or the storing of the highlight scene.

In the patent document 5, the object is to cut a commercial and there is no description of the detection or storing of a highlight scene.

The patent documents 1 to 5 do not at all describe the increase in speed or efficiency obtained by a multiple process on image data.

BRIEF SUMMARY OF THE INVENTION

An image storage device according to an example of the invention comprises a first storage unit which stores first image data; a second storage unit which stores second image data to be determined whether the second image data includes detection target data which is the same as or similar to data included in the first image data; a plurality of parallel comparison units which perform a process of comparing at least one of pixel values and pixel value total results between a frame image of the first image data and a frame image of the second image data in parallel, and determining, based on a comparison result between the frame image of the first image data and the frame image of the second image data, whether the detection target data is included in the second image data; and a third storage unit which stores, when it is determined that the detection target data is included in the second image data, the detection target data or data obtained by encoding the detection target data.

BRIEF DESCRIPTION OF THE SEVERAL VIEWS OF THE DRAWING

FIG. 5 is a block diagram showing an example of an image storage device according to the third embodiment.

DETAILED DESCRIPTION OF THE INVENTION

Figure 1:
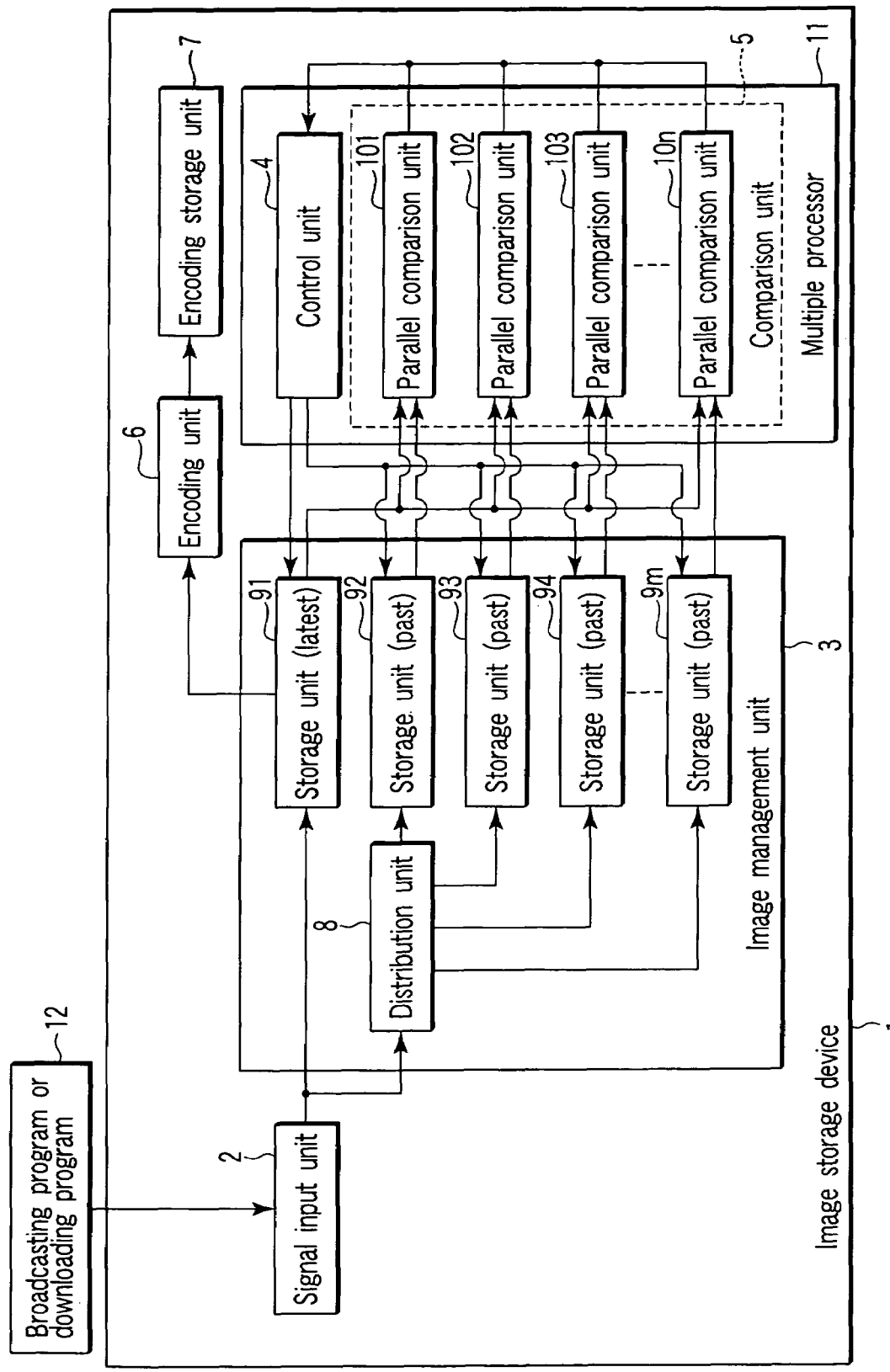
FIG. 1 is a block diagram showing an example of an image storage device according to the first embodiment.

Embodiments of the present invention will be described below with reference to the drawings. Note that like parts are denoted by like reference numerals throughout the drawings and the detailed description thereof is omitted.

First Embodiment

In the present embodiment, an image storage device will be described that temporarily stores video image data distributed from an external source and extracts replay data which corresponds to a highlight scene (for example, an important scene in sport broadcasting or a news show) and is useful in editing, searching, browsing, managing, storing, and the like, from the temporarily stored video image data. The image storage device according to the present embodiment extracts, by a parallel (multiple) process, the replay data as the highlight scene and stores the replay data.

FIG. 1 is a block diagram showing an example of an image storage device according to the present embodiment.

An image storage device 1 includes a signal input unit 2, an image management unit 3, a control unit 4, a comparison unit 5, an encoding unit 6, and an encoding storage unit 7.

The image management unit 3 includes a distribution unit 8 and storage units 91 to 9*m*. The comparison unit 5 includes parallel (multiple) comparison units 101 to 10*n*.

In the present embodiment, the control unit 4 and the parallel comparison units 101 to 10*n* are corresponding to a plurality of processors included in the multiple processor (multi-core processor) 11.

The signal input unit 2 receives a video image signal distributed from an external device 12 such as a broadcasting station or a communication station. The signal input unit 2 then decodes the video image signal, converts the decoded video image signal into video image data in a frame image unit (for example, MPEG image data is expanded to a plurality of consecutive frame images), and provides the expanded video image data to the distribution unit 8 and the storage unit 91 of the image management unit 3.

The distribution unit 8 receives the video image data from the signal input unit 2, divides past video image data, which is a portion of the video image data received from the signal input unit 2 other than latest video image data, such that frame image (field image) continuity is maintained to a certain degree, and then distributes the divided past video image data to any of the storage units 92 to 9*m*.

Specifically, the distribution unit 8 divides the past video image data in a predetermined time interval and provides the divided data to any of the storage units 92 to 9*m*. When, after the divided past video image data is stored in all of the storage units 92 to 9*m*, new divided past video image data is generated, the distribution unit 8 provides the newly generated divided past video image data to a storage unit having stored therein the oldest divided past video image data.

For the storage units 91 to 9*m*, for example, FIFO buffers, ring buffers, or the like can be used. In the storage units 91 to 9*m*, frame images of video image data are stored.

The storage unit 91 stores video image data to be determined whether to include replay data (repetition video image data) for data included in the video image data stored in the storage units 92 to 9*m*. In the present embodiment, video image data to be determined whether to include replay data is latest video image data (video image data at the current point).

In addition, the storage unit 91 provides, according to a control signal from the control unit 4, a frame image of an arbitrary time or an arbitrary sequence from among the stored video image data to the parallel comparison devices 101 to 10*n*. Furthermore, the storage unit 91 provides, upon receiving a replay sequence the control unit 4, video image data of the replay sequence to the encoding unit 6 as replay data.

Figure 2:
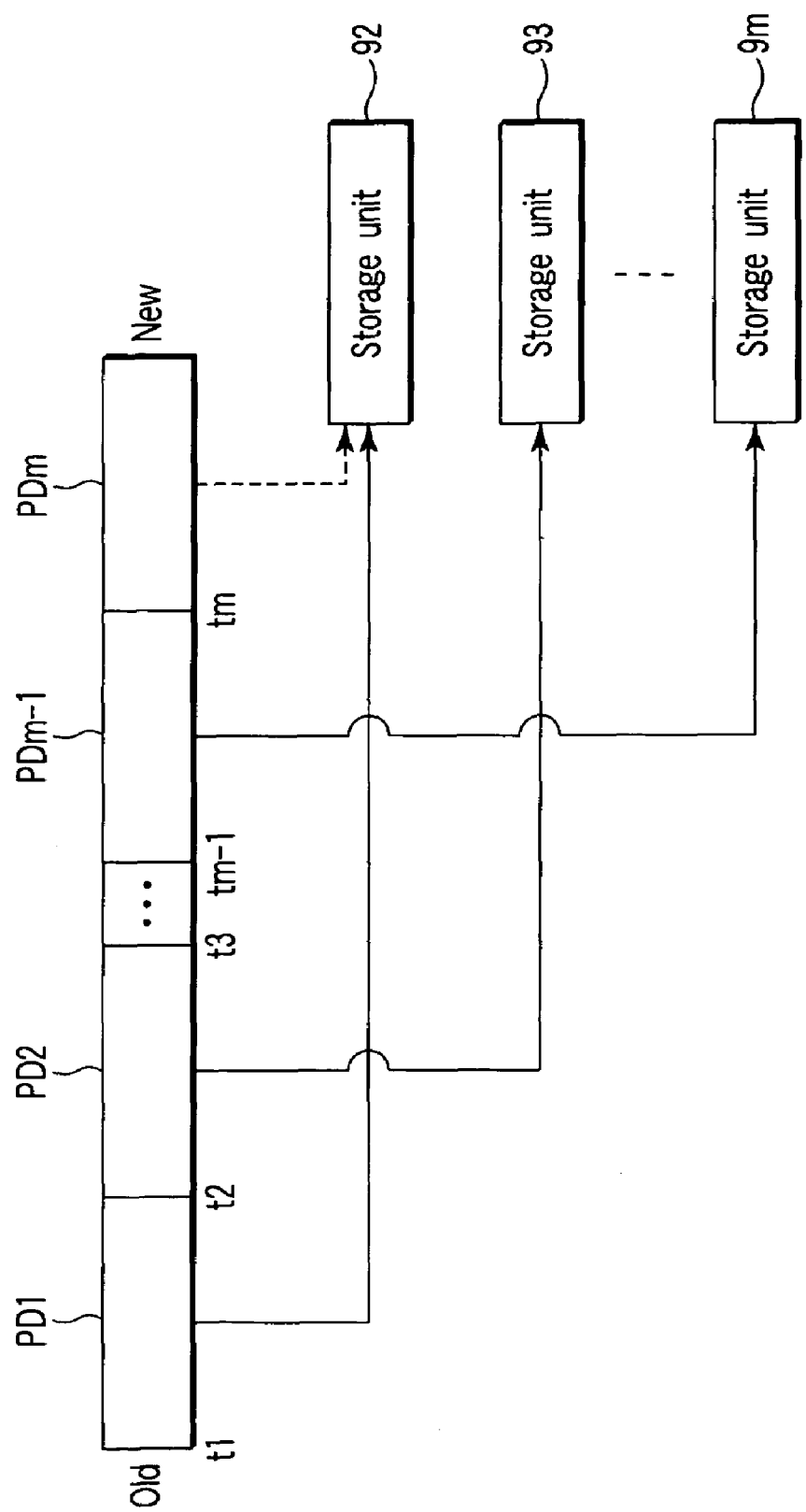
FIG. 2 is a diagram showing an example of video image data divided in a predetermined time interval.

The storage units 92 to 9*m* store the past video image data distributed by the distribution unit 8. Specifically, as shown in FIG. 2, the storage units 92 to 9*m* store past video image data PD1 to PDm-1 divided in a predetermined time interval based on broadcasted times t1 to tm-1. When new divided past video image data PDm is generated at time tm, the storage units 92 to 92*m* store the newly generated divided past video image data PDm in place of the oldest divided past video image data PD1.

Then, the storage units 92 to 9*m* provide, according to a control signal from the control unit 4, a frame image of an arbitrary time or an arbitrary sequence from among the stored divided video image data to the parallel comparison devices 101 to 10*n*.

The parallel comparison units 101 to 10*n* operate in parallel. Specifically, the parallel comparison units 101 to 10*n* perform a process on the video image data in the parallel (multiple) storage units 92 to 9*m* without interfering with one another. By thus providing the parallel comparison units 101 to 10*n* and the storage units 92 to 9*m* in parallel with each other, the parallelism and expandability of the image storage device 1 can be enhanced. The parallel comparison units 101 to 10*n* compare the frame image of the latest video image data received from the storage unit 91 with the frame images of the past video image data received from the storage units 92 to 9*m* in parallel, respectively.

The parallel comparison units 101 to 10*n* then perform a process of determining whether the image similarity (evaluation scale) between the frame image of the latest video image data received from the storage unit 91 and each of the frame images of the past video image data received from the storage units 92 to 9*m* in parallel, respectively, is greater than or equal to a predetermined level, and providing to the control unit 4 the determination results and time information (time code) for the determination results.

For example, the parallel comparison units 101 to 10*n* accept as input a single frame image of the latest video image data, search the storage units 92 to 92*m* taken charge thereby, and detects a frame image whose image similarity is greater than or equal to the predetermined level.

In addition, once the parallel comparison units 101 to 10n have detected a frame image whose image similarity is greater than or equal to the predetermined level, the parallel comparison units 101 to 10n determine whether a frame image that is advanced by the same amount of time from the frame image whose image similarity is greater than or equal to the predetermined level has an image similarity being greater than or equal to the predetermined level.

Subsequently, the parallel comparison units 101 to 10n provide to the control unit 4 the determination results of the image similarity and time information about the determination results.

The control unit 4 provides to the storage unit 91 a control signal for providing to the plurality of parallel comparison units 101 to 10n video image data of an arbitrary time or sequence. Specifically, the control unit 4 controls to specify a combination of a frame image of the latest video image data and the past video image data which are comparison targets and allows the parallel comparison units 101 to 10n to perform a comparison process.

In addition, the control unit 4 collects from the parallel comparison units 101 to 10n determination results of the image similarity and time information and determines whether replay data is included in the latest video image data. For example, the control unit 4 detects a replay sequence of the latest video image data whose image similarity is greater than or equal to the predetermined level and provides the replay sequence to the storage unit 91.

The encoding unit 6 performs an encoding process on replay data received from the storage unit 91 and provides the encoded replay data to the encoding storage unit 7.

The encoding storage unit 7 stores the encoded replay data.

Now, the operation of the image storage device 1 having the above-described configuration will be described.

A video image signal distributed from the external device 12 such as a broadcasting station or a communication station is inputted to the signal input unit 2. The signal input unit 2 decodes the video image signal, converts the decoded video image signal into video image data in a frame image unit, and provides the converted video image data to the image management unit 3. The image management unit 3 includes the FIFO storage units 91 to 9m. The storage units 91 to 9m store latest video image data and divided past video image data.

The control unit 4 controls to provide frame images of the video image data, which are comparison targets, to the parallel comparison units 101 to 10n from the storage units 91 to 9m.

A frame image of the latest video image data stored in the storage unit 91 is provided to the parallel comparison units 101 to 10n, as a comparison target on one side.

Frame images of the divided past video image data stored in the storage units 91 to 9m are provided to the parallel comparison units 101 to 10n, as comparison targets on the other side.

Specifically, the latest video image data and the past video image data which is a comparison target for the latest video image data are sequentially taken out of the storage units 91 to 9m by an operation of the control unit 4.

The parallel comparison units 101 to 10n each compare the two received video image data units, determine an image similarity, and provide a determination result and time information to the control unit 4.

The control unit 4 receives the determination results and the time information from the parallel comparison units 101 to 10n and controls to provide video image data which is the next comparison target to the parallel comparison units 101 to 10n from the storage units 91 to 9m.

The control unit 4 recognizes, as a replay sequence, a sequence in which the image similarity between the latest video image data and the past video image data is, at a certain point, greater than or equal to a predetermined level (a state in which the evaluation scale is sufficiently high), and furthermore, after a predetermined time has elapsed, the image similarity between the latest video image data and the past video image data is greater than or equal to the predetermined level and the latest video image data and the past video image data are continuously similar to each other (when the evaluation scale is continuously high).

Video image data of a replay sequence is provided, as replay data, to the encoding unit 6 from the storage unit 91 and the encoded replay data is stored in the encoding storage unit 7.

Generally, in many cases, scenes before and after a highlight scene are as important as the highlight scene. For example, it is highly possible that in scenes before and after a highlight scene a comment is made on the highlight scene.

Thus, in the present embodiment, the control unit 4 determines a replay sequence such that a sequence whose image similarity is greater than or equal to the predetermined level is extended forward and backward by a time specified by a user or by a predetermined time. By this, replay data can be stored so as to include a comment, etc., made in scenes before and after a highlight scene.

For example, a sequence obtained by adding one minute to both before and after a sequence whose similarity is greater than or equal to the predetermined level is determined as a replay sequence. In this case, the storage capacities of the storage units 91 to 9m need to be determined taking into account the amount of extension.

As such, when a replay sequence is extended, there is less need to precisely detect the start and end frame images of a sequence with a high image similarity. Accordingly, even when a comparison process is performed after a temporal frame image thinning-out process is performed on the latest video image data and the past video image data or after a process of reducing the amount of information such as compression of frame image pixel values is performed, a detection result of replay data is not affected much.

For before and after a frame image that greatly changes temporally such as switching of scenes, too, it is desirable that switching being performed by, for example, using a pre-processing unit for a frame image encoding process or part of processing units be recognized and included in a replay sequence.

Now, a specific exemplary application of the image storage device 1 having the above-described configuration will be described.

The image storage device 1 according to the present embodiment continuously stores video image data of a specific channel specified to view or specified to store.

The video image data of the specific channel is continuously stored in the image management unit 3 by a FIFO format.

The video image data once stored in the image management unit 3 is sequentially deleted in the order of oldest to newest, unless there is an instruction from the user.

However, when an instruction is inputted by the user to go back and record, a portion of the video image data for the instruction is not deleted and is subjected to an encoding process and then the encoded data is stored in the encoding storage unit 7.

The image storage device 1 is a device that automatically specifies a highlight scene which is not deleted and stores the scene, and automatically detects replay data as a highlight scene and stores the replay data.

As the latest video image data, frame images from the current frame image back to a frame image of about five minutes ago are used. Since the object is to detect replay data, it is considered that the latest video image data of about five minutes is sufficient. Note that the length of the latest video image data can be arbitrarily changed.

In the present embodiment, a comparison process is performed between all frame images of the latest video image data and all frame images of the past video image data before the latest video image data.

The latest video image data of about five minutes is stored in the FIFO format. The time length of video image data on which a comparison process is performed is one element that determines the storage capacity of the FIFO image management unit 3. When "go back and record" instruction is issued by the user and video image data of a predetermined time (e.g., two hours) ago is stored, the image management unit 3 needs to have a capacity capable of storing video image data of the predetermined time or more.

In the present embodiment, in the calculation of an image similarity by the parallel comparison units 101 to 10n, there is no need to use complex and sophisticated algorithms such as image processing and image recognition and the calculation is performed using a simple process such as a comparison of pixel values between frame images or a comparison of total results of pixel values between frame images. An example of the total results of pixel values between frame images includes statistical calculation results for pixel values between frame images.

For example, the parallel comparison units 101 to 10n determine an image similarity based on the sum of absolute values of differences in pixel value between frame images, the sum of absolute values of differences in bias correction values between frame images, and the normalized correlation between frame images.

Note that in the present embodiment the simple process is meant to be a simple and standardized process as an algorithm and be a process that can be performed in parallel.

In a highlight scene, telop characters, the characters "Replay", or the like may be added to original video image data.

Hence, in the parallel comparison units 101 to 10n, the predetermined level for the image similarity is set taking into account processed conditions in the highlight scene.

In the present embodiment, since a comparison between frame images does not need to be made so precisely, if a frame image similar to some extent is found, the frame image is determined to be the one which is likely to be part of replay data.

Figure 3:
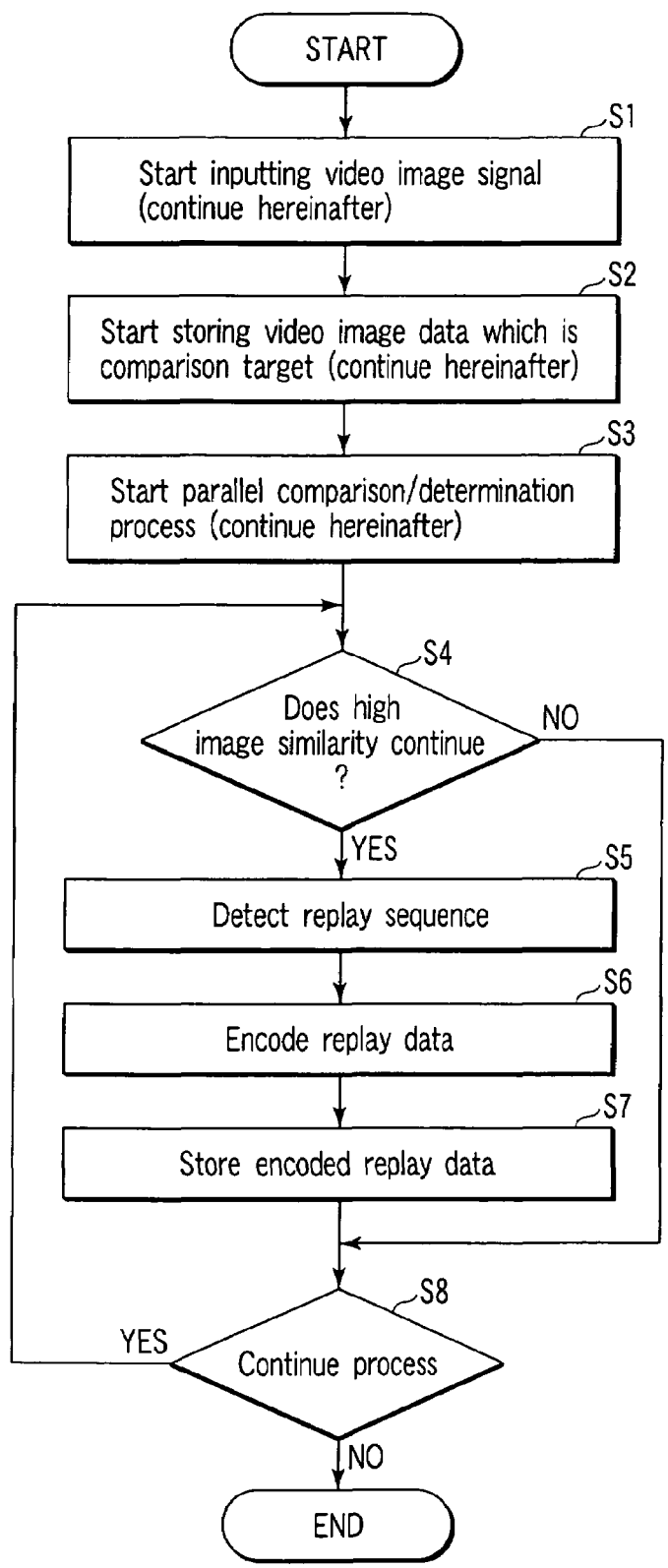
FIG. 3 is a flowchart showing an example of a schematic process of the image storage device according to the first embodiment.

FIG. 3 is a flowchart showing an example of schematic process of the image storage device 1 according to the present embodiment.

In step S1, the signal input unit 2 starts to accept as input a video image signal and obtains video image data. The input of a video image signal continues until the process ends.

In step S2, the storage units 91 to 9m start to store the latest video image data and the past video image data. The storing of latest video image data and past video image data continues until the process ends.

In step S3, the parallel comparison units 101 to 10n of the multiple processor 11 start to perform a parallel (multiple) comparison/determination process on the latest video image data and the past video image data. The parallel comparison/determination process continues until the process ends.

In step S4, the control unit 4 determines whether an image similarity greater than or equal to a predetermined level continues. If a replay sequence is not detected, the process moves to step S8.

If an image similarity greater than or equal to the predetermined level continues, in step S5, the control unit 4 detects a replay sequence.

In step S6, the encoding unit 6 encodes replay data for the replay sequence.

In step S7, the encoding storage unit 7 stores the encoded replay data.

In step S8, the image storage device 1 determines whether to continue the process. If the process continues, the process returns to step S4.

Advantageous effects of the above-described image storage device 1 according to the present embodiment will be described.

The image storage device 1 according to the present embodiment actively uses a property that a highlight scene is repeatedly replayed and thus extracts replay data, whereby a highlight scene is extracted.

In the present embodiment, replay data is efficiently recognized and stored using the multiple processor 11. By this, a highlight scene which is repeatedly broadcasted can be cut out.

In the present embodiment, the parallel comparison units 101 to 10n compare frame images and detect replay data, according to control by the control unit 4. Thus, without using complex and sophisticated algorithms such as image processing and image recognition and without depending on the performance of an image processing algorithm and an image recognition algorithm, and only with a simple process such as a comparison process, replay data can be detected as a highlight scene and stored.

In the present embodiment, in some cases, it is not necessary to precisely calculate and determine the image similarity between frame images. The reason that the image similarity does not need to be precisely determined is that, although a few images may happen to be similar to each other, it is less likely that the image similarity is continuously high for a few seconds. By detecting the case in which the image similarity being high continues over a plurality of frame images, a determination as to the image similarity of individual frame images may be inexact. Thus, in the present embodiment, by adjusting the predetermined level used to determine the image similarity, the influence exerted by, for example, the insertion of telop characters in or the addition of characters to a highlight scene can be reduced.

In the present embodiment, by a process suitable for the multiple processor 11, replay data can be selected from inputted video images and stored.

In the present embodiment, since a replay sequence is detected such that a sequence with a high image similarity which is obtained by comparing video image data is further extended forward and backward, replay data that includes a comment made before and after a highlight scene can be stored.

Note that in the present embodiment the parallel comparison units 101 to 10n each perform a comparison process by using a pixel value of a frame image of latest video image data and a pixel value of a frame image of past video image data. However, for example, the parallel comparison units 101 to 10n each may perform a comparison process by using a color histogram of a frame image of latest video image data and a color histogram of a frame image of past video image data.

Similarly, the parallel comparison units 101 to 10n each may perform a comparison process by using a brightness histogram of a frame image of latest video image data and a brightness histogram of a frame image of past video image data.

Second Embodiment

In the present embodiment, a video image storage device that detects replay data from video image data of a plurality of channels in parallel and stores the replay data will be described.

Figure 4:
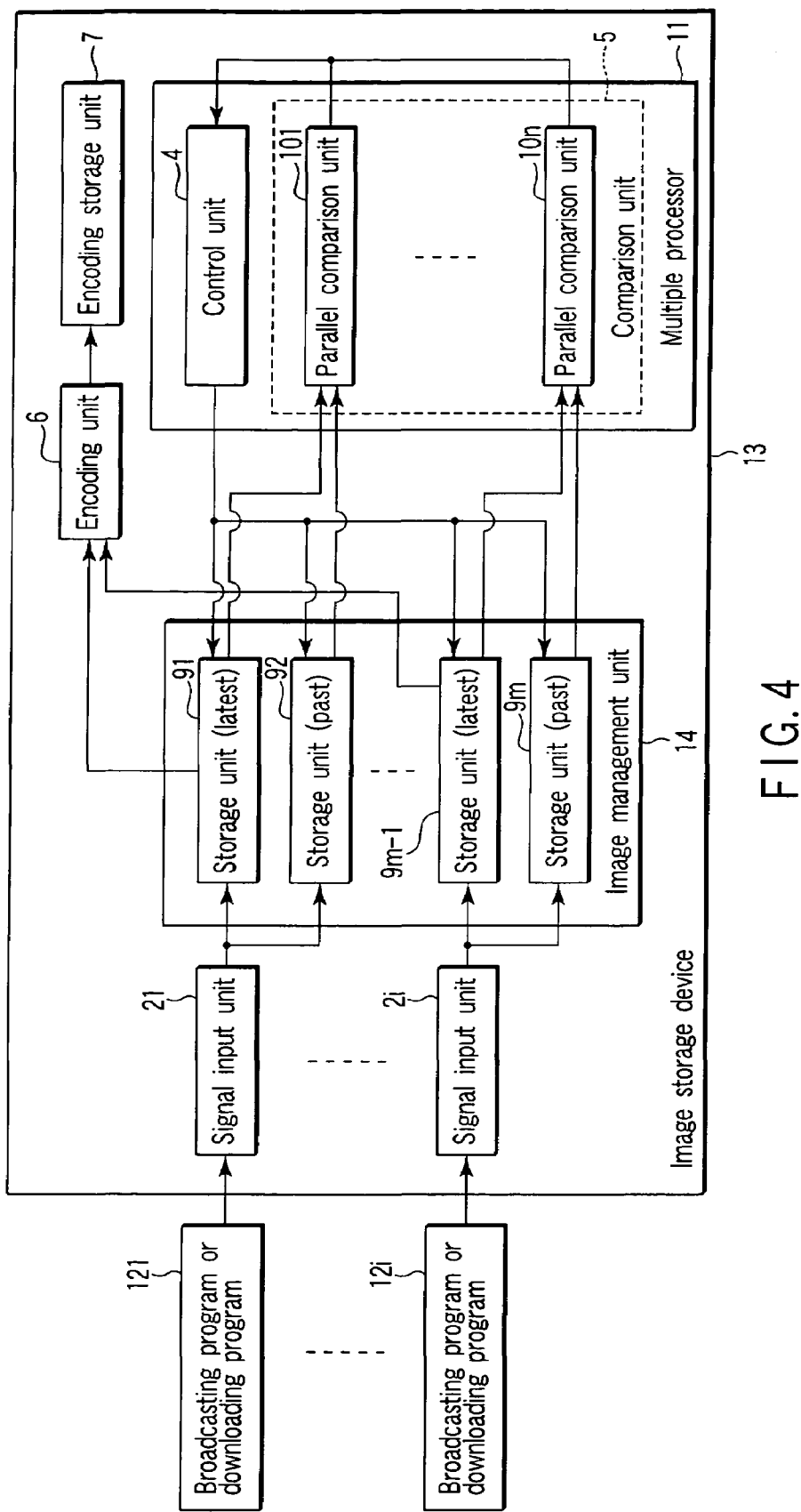
FIG. 4 is a block diagram showing an example of an image storage device according to the second embodiment.

FIG. 4 is a block diagram showing an example of an image storage device according to the present embodiment.

An image storage device 13 includes signal input units 21 to 2i, an image management unit 14, a control unit 4, a comparison unit 5, an encoding unit 6, and an encoding storage unit 7.

The signal input units 21 to 2i receive video image signals of a plurality of channels which are distributed from a plurality of external devices 121 to 12i such as broadcasting stations or communication stations.

The signal input units 21 to 2i decode the video image signals of the plurality of channels, convert the decoded video image signals into video image data in a frame image unit, and provide the converted video image data to storage units 91 to 9m of the image management unit 14.

In the present embodiment, the storage units 91 to 9m store latest video image data of each channel and past video image data of each channel.

Parallel comparison units 101 to 10n compare, on a channel-by-channel basis, a frame image of the latest video image data with a frame image of the past video image data and determine whether the image similarity is greater than or equal to a predetermined level.

The control unit 4 detects a replay sequence based on the determination result of the image similarity and provides the replay sequence to storage units that store the latest video image data.

The image management unit 14 may store video image data of all receivable channels continuously for 24 hours.

By the above-described image storage device 13 according to the present embodiment, video image data of a plurality of channels can be continuously stored and replay data can be extracted from the video image data of the plurality of channels and stored.

By this, the user can view only important scenes of all channels. For example, to store video image data of all channels for 24 hours, an enormous amount of storage capacity is required. On the other hand, in the present embodiment, only replay data is detected and other low-importance scenes can be automatically deleted.

Third Embodiment

In the present embodiment, an image storage device for detecting, even when the replay speed of a highlight scene is different, the highlight scene as replay data will be described.

FIG. 5 is a block diagram showing an example of an image storage device according to the present embodiment.

An image storage device 15 includes a signal input unit 2, an image management unit 16, a control unit 4, a comparison unit 5, an encoding unit 6, and an encoding storage unit 7.

The image management unit 16 includes speed changing units 171 to 17k and storage units 91 to 9m.

The signal input unit 2 receives a video image signal and a sound signal which are distributed from an external device 12.

The signal input unit 2 decodes the video image signal and the sound signal, converts the decoded video image and sound signals into video image data and sound data, and provides the video image data and the sound data to the speed changing units 171 to 17k and the storage units 91 and 92 of the image management unit 16.

The speed changing units 171 to 17k receive the video image data and the sound data from the signal input unit 2 and generate speed changed data including the video image data whose replay speed is changed and the sound data whose replay speed is changed.

For example, the speed changing units 171 to 17k insert a frame image between arbitrary frame images of the video image data and insert sound data between sound data, thereby generating speed changed data corresponding to a slow replay. Note that by deleting a frame image of the video image data and the sound data, speed changed data corresponding to a high-speed replay can be generated.

In the case of inserting a frame image in the video image data, for example, the frame image to be inserted may be the same frame image as one of frame images before and after the insertion location. Alternatively, for example, the frame image to be inserted may be the one having a condition between frame images before and after the insertion location. The same applies to the insertion of sound data.

In the speed changing units 171 to 17k, the inserted or deleted numbers of frame images and sound data are different. By this, the speed changing units 171 to 17k generate speed changed data with different replay speeds.

The speed changing units 171 to 17k then provide the speed changed data to the storage units 93 to 9m.

The storage unit 91 provides, according to a control signal from the control unit 4, a frame image and a sound data of an arbitrary time or an arbitrary sequence from among the stored latest video image data and sound data, to parallel comparison units 101 to 10n. In addition, the storage unit 91 provides, upon receiving a replay sequence from the control unit 4, video image data and sound data of the replay sequence to the encoding unit 6, as replay data and sound data for the replay data.

The storage unit 92 stores frame images of past video image data with a normal replay speed and sound data.

The storage unit 92 provides, according to a control signal from the control unit 4, a frame image and a sound data unit of an arbitrary time or an arbitrary sequence from among the past image data with a normal speed and the sound data, to the parallel comparison unit 101.

The storage units 93 to 9m store speed changed data. In the present embodiment, the storage units 93 to 9m store speed changed data for past video image data and sound data.

The storage units 93 to 9m provide, according to a control signal from the control unit 4, a frame image and a sound data unit of an arbitrary time or an arbitrary sequence from among the stored speed changed data, to the parallel comparison units 102 to 10n, respectively.

The parallel comparison unit 101 compares the frame image of the latest video image data received from the storage unit 91 with the frame image of the past video image data with a normal speed received from the storage unit 92 and determines whether the image similarity between the frame image of the latest video image data and the frame image of the past video image data with a normal speed is greater than or equal to a predetermined image determination level.

In addition, the parallel comparison unit 101 compares the latest sound data received from the storage unit 91 with the sound data with a normal speed received from the storage unit 92 and determines whether the sound similarity between the latest sound data and the past sound data with a normal speed is lower than or equal to a predetermined sound determination level.

The parallel comparison units 102 to 10n compare the frame image of the latest video image data received from the storage unit 91 with the frame images of the speed changed data received from the storage units 93 to 9m, respectively. In addition, the parallel comparison units 102 to 10n each determine whether the image similarity between the frame image of the latest video image data and each of the frame images of the speed changed data is greater than or equal to the predetermined image determination level. If the image similarity is greater than or equal to the predetermined image determination level, the parallel comparison units 102 to 10n provide the image similarities and time information about the image similarities to the control unit 4.

In addition, the parallel comparison units 102 to 10n compare the latest sound data received from the storage unit 91 with the sound data of the speed changed data received from the storage units 93 to 9m, respectively. In addition, the parallel comparison units 102 to 10n each determine whether the sound similarity between the sound data of the latest video image data and the sound data of the speed changed data is lower than or equal to the predetermined sound determination level. If the sound similarity is lower than or equal to the predetermined sound determination level, the parallel comparison units 102 to 10n provide the sound similarities and time information about the sound similarities to the control unit 4.

The control unit 4 detects a sequence in which the image similarity is greater than or equal to the predetermined level and the sound similarity is lower than or equal to the predetermined level as a replay sequence with a changed replay speed, for example, which is obtained by a slow-motion or fast-motion process.

The control unit 4 detects a sequence in which the image similarity and the sound similarity are both greater than or equal to the predetermined level, as a replay sequence with an equal replay speed.

The control unit 4 determines a replay sequence in which the image similarity is greater than or equal to the predetermined image determination level, the sound similarity is greater than or equal to the predetermined sound determination level, and the length of the replay sequence matches the replay time of a commercial, to be a commercial and thus does not provide the replay sequence to the storage unit 91.

Specifically, in the present embodiment, when the time which is determined to be a replay sequence is about 15 or 30 seconds, for example, the replay sequence is recognized as a commercial.

The encoding unit 6 encodes replay data and sound data for the replay data.

The encoding storage unit 7 stores the encoded replay data and encoded the sound data for the replay data.

Now, the operation of the image storage device 15 having the above-described configuration will be described.

The image storage device 15 can efficiently recognize a slow-motion highlight scene and a high-speed highlight scene.

The image management unit 16 includes the parallel (multiple) storage units 93 to 9m that store past video image data and sound data for different assumed replay speeds. For example, to detect a slow-motion highlight scene which is extended twice, speed changed data obtained by extending past video image data and sound data to twice their original replay speeds is generated in advance and stored in the storage unit 94. Alternatively, for example, to detect a slow-motion highlight scene which is extended three times, speed changed data obtained by extending past video image data and sound data to three times their original replay speeds is generated in advance and stored in the storage unit 9m.

In this manner, the image management unit 16 stores speed changed data for necessary replay speeds in parallel.

For example, to generate speed changed data which is extended 1.5 times, the speed changing unit 171 first outputs a single frame image and a single sound data unit which are the same as inputted frame image and sound data unit and then outputs two frame images and two sound data units which are the same as the inputted frame image and sound data unit. Thereafter, likewise, the speed changing unit 171 alternately performs an output for a single frame image and a single sound data unit and two outputs of a frame image and a sound data unit.

For example, to generate speed changed data which is extended which is extended twice, the speed changing unit 172 outputs two frame images and two sound data units which are the same as inputted frame image and sound data unit.

For example, to generate speed changed data for one-third speed, the speed changing unit 17k outputs three frame images and three sound data units which are the same as inputted frame image and sound data unit.

By thus increasing or decreasing the number of frame images and sound data units to be outputted according to an input of a frame image and a sound data unit, the replay speed of video image data and sound data can be changed to an arbitrary speed. The speed can be increased by reducing the number of outputs of a frame image and a sound data unit with respect to the number of inputs of a frame image and a sound data unit.

Instead of using a technique of changing a replay speed by outputting the same frame image and sound data as inputted frame image and sound data, the speed changing units 171 to 17k may generate a frame image and sound data which are inserted by image processing and sound processing.

For example, based on sequentially inputted two frame images and two sound data units, an average image frame image and an average sound data unit may be generated and the average image frame image and sound data unit may be inserted between the sequentially inputted two frame images and two sound data units.

When inputted video image data is provided with a video image encoding process, such as MPEG2, MPEG4, or H264, that uses a differential between frame images, based on the encoded data provided with the video image coding process, a frame image to be inserted may be generated.

In the present embodiment, speed changed data should be generated with an accuracy level with which whether an arbitrary portion of latest video image data is replay data can be determined. Therefore, even when speed changed data is generated by a simple process such as an increase or decrease of the number of frame images and sound data units, the speed changed data satisfactorily functions.

In the above-described present embodiment, speed changed data is generated taking into consideration the extension or compression of a highlight scene in a time direction, and frame images and sound data units are compared in time series. By this, replay data for a highlight scene provided with a process such as fast forward or slow motion can be efficiently detected. In addition, even when a highlight scene is not replayed at an equal speed to a past scene, the highlight scene can be efficiently detected.

In the present embodiment, attention is focused on the point that, when a highlight scene is in slow motion or fast motion, sound data is different between a past scene and the highlight scene with a very high possibility. The case in which the image similarity is greater than or equal to the predetermined image determination level and the sound similarity is lower than or equal to the predetermined sound determination level is recognized that replay data corresponds to a highlight scene in slow motion or fast motion. By this, the recognition capability of the image storage device 15 can be improved. The case in which the image similarity is greater than or equal to the predetermined image determination level and the sound similarity is greater than or equal to the predetermined sound determination level is recognized that replay data is a highlight scene with an equal speed.

As in the present embodiment, by using the multiple processor 11 to compare frame images and sound data units, a plurality of versions of video image data and sound data whose replay speeds are changed can be prepared and compared and each comparison/determination process can be performed in parallel, and thus, the processing time can be reduced.

There may be a highlight scene whose replay speed dynamically changes. For such a highlight scene whose replay speed dynamically changes, the parallel comparison units 101 to 10n determine the image similarity by switching between the storage units 92 to 9m to be accessed.

For example, when a highlight scene whose replay speed gradually slows down is detected, first, the similarity between latest video image data and past video image data with the same speed is high, and gradually the similarities between the latest video image data and speed changed data for half, one-third, and quarter speeds become high.

The control unit 4 may detect a dynamic speed change based on changes in similarity received from the parallel comparison units 101 to 10n and determine a replay sequence according to the changes in similarity.

When the replay speed of a highlight scene is dynamically changing, in order to compare images by switching the replay speed, speed changed data needs to be provided with a common time code. Specifically, a time code in common with that of past video image data whose speed has not been changed is provided to speed changed data whose speed has changed. For example, the date, time, seconds, frame image number of a frame image of past video image data are provided to the same frame image of speed changed data. By providing time information to speed changed data, user convenience can be enhanced such as the ability to grasp which past video image data unit the detected replay data corresponds to.

In the present embodiment, for example, the replay speed of replay data may be detected using information indicating which storage unit the data was stored in, and a determination as to whether the replay data is in slow motion may be made. For example, in baseball broadcasting, almost all pitcher's pitches are replayed. Even in such a case, by user setting, for example, by storing only replay data in slow motion, only replay data for a real highlight scene replayed in slow motion can be stored. This enhances user convenience.

Fourth Embodiment

In the present embodiment, compression of the amount of information in the parallel comparison units 101 to 10n according to the above-described embodiments will be described.

If pixel values of all frame images are compared as they are, a workload increases. In view of this, the amount of information on latest video image data and past video image data which are comparison targets is compressed.

In compression of the amount of information according to the present embodiment, the use of image processing in which image data is converted into names of people by face recognition, image processing in which the meaning of a scene is recognized, and the like results in converting the amount of information on images into heterogeneous information, and thus, is considered to be not effective.

Hence, in the present embodiment, for example, the amount of information on latest video image data and past video image data is reduced by a reduction of color resolution, a reduction of brightness resolution, a reduction of image size or sampling. In the present embodiment, the amount of information on images is compressed to such an extent that whether there is similarity between latest video image data and past video image data can be determined.

Although in the following the case in which the amount of information on video image data is compressed in the above-described first embodiment is described as an example, the same can be applied to the second and third embodiments.

For example, in comparing a frame image of latest video image data with a frame image of past video image data, the parallel comparison units 101 to 10n do not use three colors of RGB in a comparison process but use only two or one color(s) of RGB. Selection of a color used for comparison corresponds to compression of color resolution.

Alternatively, for example, in comparing a frame image of latest video image data with a frame image of past video image data, the parallel comparison units 101 to 10n do not use RGB but use only at least one of a Y signal, a Cb signal, and a Cr signal.

Specifically, the parallel comparison units 101 to 10n may perform a comparison process using only a Y signal (brightness signal). Alternatively, the parallel comparison units 101 to 10n may perform a comparison process by reducing the bit length of a Y signal. For an exemplary technique of reducing the bit length, there is a technique that uses only values of higher-order bits. The selection of a signal from a Y signal, a Cb signal, and a Cr signal used for comparison corresponds to compression of brightness resolution.

For example, the parallel comparison units 101 to 10n compress a color gradation of a frame image of latest video image data and a color gradation of a frame image of past video image data and then perform a comparison.

Specifically, the parallel comparison units 101 to 10n compress latest video image data and past video image data from a 256-step gradation to a 16-step gradation and then perform a comparison.

Alternatively, for example, the parallel comparison units 101 to 10n compress latest video image data and past video image data to a size of VGA (Video Graphics Array), QVGA (Quarter Video Graphics Array), or CIF (Common Intermediate Format) and then perform a comparison.

Alternatively, for example, the parallel comparison units 101 to 10n reduce the image sizes of a frame image of latest video image data and a frame image of past video image data to compress the amount of information and then perform a comparison. Specifically, the parallel comparison units 101 to 10n reduce the horizontal/vertical image size of each of a frame image of latest video image data and a frame image of past video image data to half or quarter size and thereby reduce the amount of information to one quarter or one sixteenth.

In compressing information on latest video image data and past video image data, a frame image reducing (thinning-out) process in a time direction may be used.

That is, the parallel comparison units 101 to 10n select a frame image used for comparison from frame images stored in the storage units 91 to 9m in an arbitrary interval. By this, the process can be made efficient.

Specifically, the parallel comparison units 101 to 10n sample one frame image every 0.5 second and perform a comparison. In the case of video image data with a frame image rate of 30 fps, by sampling one frame image every 0.5 second, the amount of information is reduced to one fifteenth of its present amount.

When sampling is performed under such a condition, a maximum lag of 0.5 second occurs between video image data units which are comparison targets, and thus, a predetermined level which is a determination reference for image similarity needs to be relaxed.

It is desirable that a determination as to in what time interval a frame image selection can be performed be made taking into account the amount of change in video image data. By referring to the total sum of differentials between all frame images of video image data, the sampling rate may be set.

Figure 6:
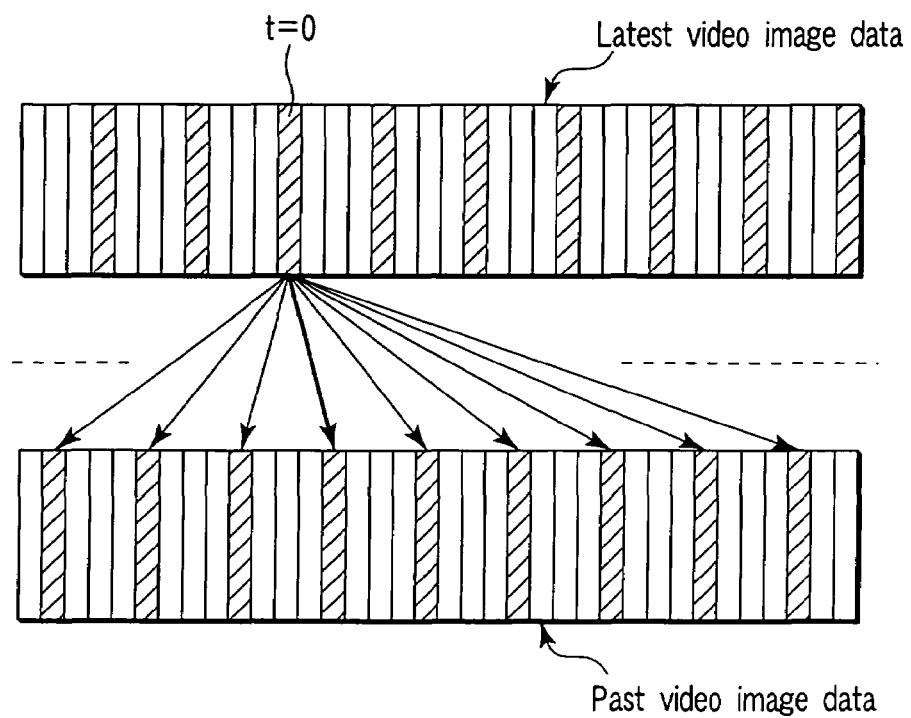
FIG. 6 is a diagram showing an example of a sampling state of frame images of latest video image data and frame images of past video image data according to the fourth embodiment.

FIG. 6 is a diagram showing an example of sampling state of frame images of latest video image data and frame images of past video image data.

FIG. 6 shows a state in which the first frame image whose image similarity becomes greater than or equal to the predetermined level is searched. Given that the first frame image whose image similarity becomes greater than or equal to the predetermined level is t=0. A temporal frame image reducing process is performed on the latest video image data and the past video image data. In the latest video image data of FIG. 6, one frame image is sampled every four frame images and is used for comparison. In the past video image data, likewise, one frame image is sampled every four frame images and is used for comparison.

In the sampling, timing of the latest video image data does not need to exactly match timing of the past video image data. FIG. 6 shows a state in which sampling timing is shifted by two frame images between the latest video image data and the past video image data.

In addition, a sampling interval of the latest video image data does not need to match a sampling interval of the past video image data. In both of the sampling intervals, by setting a small rate (by reducing the number of images to be thinned out), comparison accuracy is improved. However, performing sampling with a small rate increases a workload. Thus, the sampling rate is determined by a trade-off.

When, as shown in FIG. 6, a frame image of the latest video image data is determined to have a high similarity with respect to a frame image of the past video image data (when a frame image of t=0 is detected), then a determination is made as to whether a subsequent frame image of the latest video image data has a high similarity with respect to a subsequent frame image of the past video image data.

In FIG. 6, it is assumed that the latest video image data and the past video image data have an equal replay speed. As such, to determine whether replay data with an equal speed to the past video image data is included in the latest video image data, a frame image is referred to in turn and a comparison/determination process is performed.

In the present embodiment, a frame image of latest video image data whose image similarity becomes greater than or equal to the predetermined level is considered to be a start frame image of a replay sequence, and then a frame image of the latest video image data whose image similarity becomes lower than the predetermined level is considered to be an end frame image of the replay sequence.

When sampling is performed, the start frame image and end frame image of a replay sequence may not be temporally correct; however, this does not cause much problem in the present embodiment whose object is to store a highlight scene. To prevent a frame image different than a highlight scene from being included immediately before an end frame image, frame images before the end frame image should be cut out. To precisely determine a start frame image and an end frame image, the image similarity of each of frame images between the start frame image and the end frame image of latest video image data should be checked again.

In the present embodiment, for example, after first the image similarity between frame images is determined to be greater than or equal to the predetermined level, the parallel comparison units 101 to 10n may increase an information compression rate (reduce the amount of information on images) and then perform a comparison process between frame images. This is because when data is not highlight data the similarity is less likely to be continuously high for a few seconds, and when data is highlight data the similarity is more likely to be continuously high for a few seconds.

Figure 7:
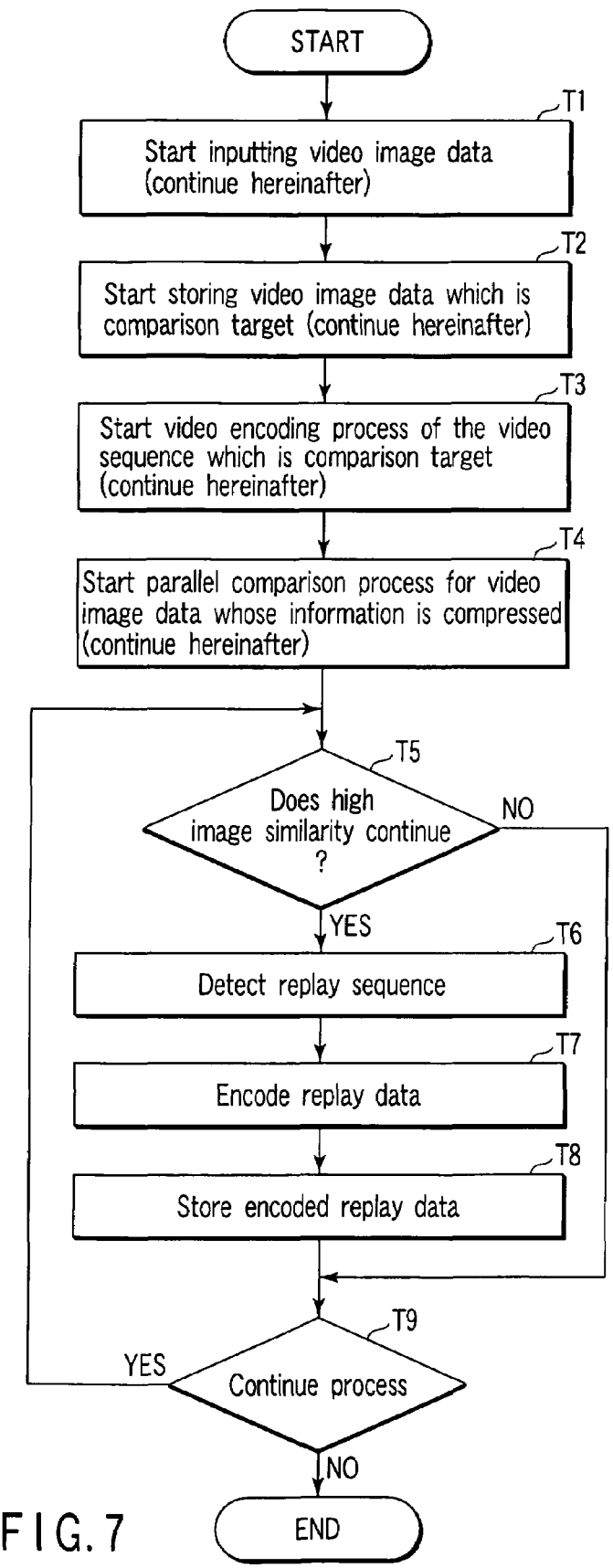
FIG. 7 is a flowchart showing an example of a schematic process of an image storage device according to the fourth embodiment.

FIG. 7 is a flowchart showing an example of schematic process of the image storage device according to the present embodiment.

Steps T1 and T2 are the same as the steps S1 and S2 of FIG. 3.

In step T3, the parallel comparison units 101 to 10n start a parallel (multiple) information amount compression process on latest video image data and past video image data. The information amount compression process continues until the process ends.

In step T4, the parallel comparison units 101 to 10n start a parallel comparison process between the latest video image data whose information is compressed and the past video image data whose information is compressed. The parallel comparison process after an information compression continues until the process ends.

Steps T5 to T9 are the same as the steps S4 to S8 of FIG. 3.

In the above-described present embodiment, since the amount of information on frame images is compressed and a comparison process is performed after information compression, the workloads of the parallel comparison units 101 to 10n can be reduced.

In addition, in the present embodiment, since a formulated simple process is used for the information amount compression process, it is possible to prevent recognition performance from depending on an image processing algorithm.

In the present embodiment, by reducing workloads, an image storage device can be realized with simple hardware.

In the case where a scene in which switching is done is included in a replay scene, the image similarity between latest video image data and past video image data may be greater than or equal to the predetermined level in all frame images except for a frame image corresponding to the switching scene and may be lower than the predetermined level in the frame image corresponding to the switching scene. Such a phenomenon is considered to be more likely to occur when sampling is performed on the latest video image data and the past video image data or when a frame image reducing process is performed.

Even in such a case, to allow a replay scene including a switching scene to be detected as a series of replay scenes, even if the image similarity becomes greater than or equal to the predetermined level and then temporarily falls below the predetermined level, when the image similarity once again becomes greater than or equal to the predetermined level within a predetermined interval, the control unit 4 may detect the replay scene including the switching scene as a series of the replay scenes.

For example, even after the image similarity falls from being greater than or equal to the predetermined level to being lower than to the predetermined level, the parallel comparison units 101 to 10n temporally reduce a frame image and continue a determination by the image similarity, and the control unit 4 detects a replay scene including a switching scene as a series of replay scenes.

For example, when the parallel comparison units 101 to 10n temporally perform sampling on latest video image data and past video image data, the parallel comparison units 101 to 10n or the control unit 4 uses an algorithm that continuously monitors the amount of change in image similarity over time and allows a temporary drop in image similarity. In order to allow a temporary drop in image similarity, for example, the parallel comparison units 101 to 10n or the control unit 4 may use a loosely set reference value or may make a determination using an average value of image similarities for each certain interval.

Alternatively, for example, as a pre-process of the parallel comparison units 101 to 10n, a process may be added of calculating a change rate of latest video image data over time and excluding a frame image whose change rate over time exceeds a predetermined change allowable level, from a comparison target for past video image data. The change rate of video image data over time can be calculated by using a time differential value or the like.

Fifth Embodiment

In the present embodiment, the case in which a comparison process is performed on a certain region of a frame image and an image similarity is calculating will be described.

Figure 8:
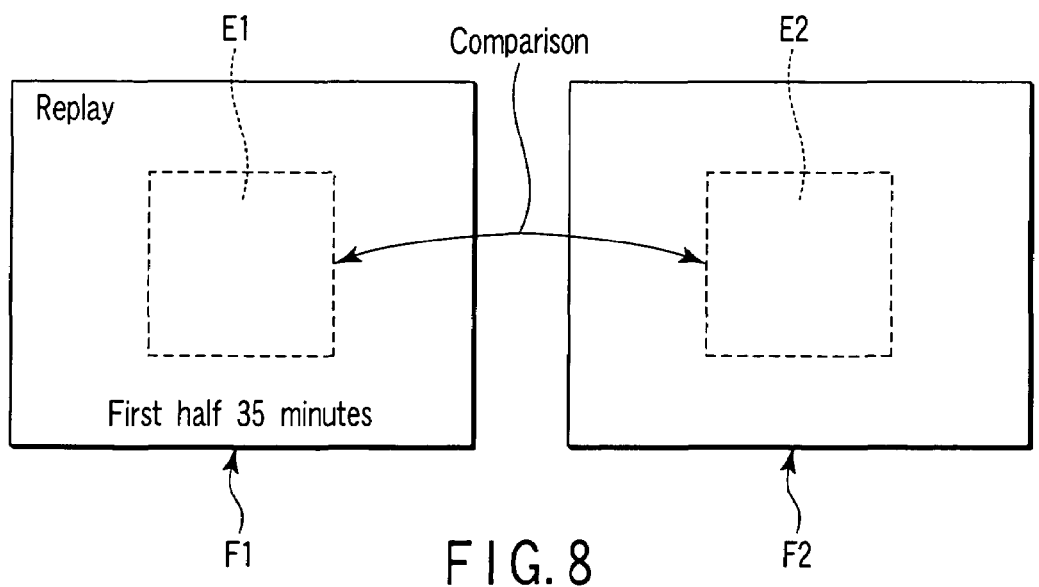
FIG. 8 is a diagram showing an example of a frame image comparison state according to the fifth embodiment.

FIG. 8 is a diagram showing an example of frame image a comparison state according to the present embodiment.

For example, the parallel comparison units 101 to 10n perform a comparison process between a predetermined region E1 of a frame image F1 of latest video image data and a predetermined region E2 of a frame image F2 of past video image data.

When the latest video image data includes a replay scene, in many cases, telop characters or subtitles are written over the top, bottom, left, or right edge of the frame image F1 of the latest video image data. Thus, an edge region of the frame image over which telop characters are expected to be written is excluded from a target for a comparison process and an image similarity determination, and central regions E1 and E2 of the frame images are targets for a comparison process and an image similarity determination.

By this, the image similarity can be determined without being affected by telop characters, subtitles, or the like. In addition, a highlight scene to which telop characters or the like are added can be detected as replay data.

In the present embodiment, the image similarity between the frame images F1 and F2 may be calculated by dividing each of the frame images F1 and F2 into a plurality of grid blocks, assigning a low weight to the image similarities of blocks at the top, bottom, left, and right edges, and assigning a high weight to the image similarities of blocks at the central portion.

In the present embodiment, when each of the frame images F1 and F2 is divided into a plurality of grid blocks, an image similarity is calculated for individual blocks, and it is determined that blocks whose number exceeds a predetermined number (e.g., 70%) have an image similarity greater than or equal to a predetermined level, it may be determined that the frame images are similar to each other.

Sixth Embodiment

In the present embodiment, recognition for the case in which a highlight scene is replayed at a different location will be described.

In the present embodiment, each of the parallel comparison units 101 to 10n first compares a frame image of latest video image data with a frame image of past video image data without any change to the frame images.

In the case where there is an overlapping scene between the latest video image data and the past video image data but the size is changed or a scene is deviated to the top, bottom, left, or right, if a comparison process is performed between frame images without any change to the frame images, the similarity is low.

In view of this, in the present embodiment, when the image similarity is less than a predetermined level, the parallel comparison units 101 to 10n each create a brightness histogram for both frame images.

The parallel comparison units 101 to 10n each determine, based on the created brightness histograms, whether the image similarity between the frame images is greater than or equal to the predetermined level. When a deviation to the top, bottom, left, or right is minute, the brightness histograms are similar between the frame images. When telop characters or the like are written over a frame image, the histograms differ from each other in a portion of the brightness value of the written telop characters. However, even in this case, since the brightness histograms are partially similar to each other, this partial similarity of the brightness histograms is determined.

In the above-described present embodiment, even when the display location of a highlight scene is different, replay data for the highlight scene can be detected and stored.

Note that even when the parallel comparison units 101 to 10n each calculate a similarity by allowing data in a predetermined region of a frame image to make a small movement to the top, bottom, left, or right to search for an overlapping location and calculating a sum of absolute values of differences in pixel value in an overlapping region, the same advantageous effects can be obtained.

Seventh Embodiment

In the present embodiment, the case will be described in which a telop character region is actively recognized and a comparison process is performed excluding the telop character region from a comparison target.

Figure 9:
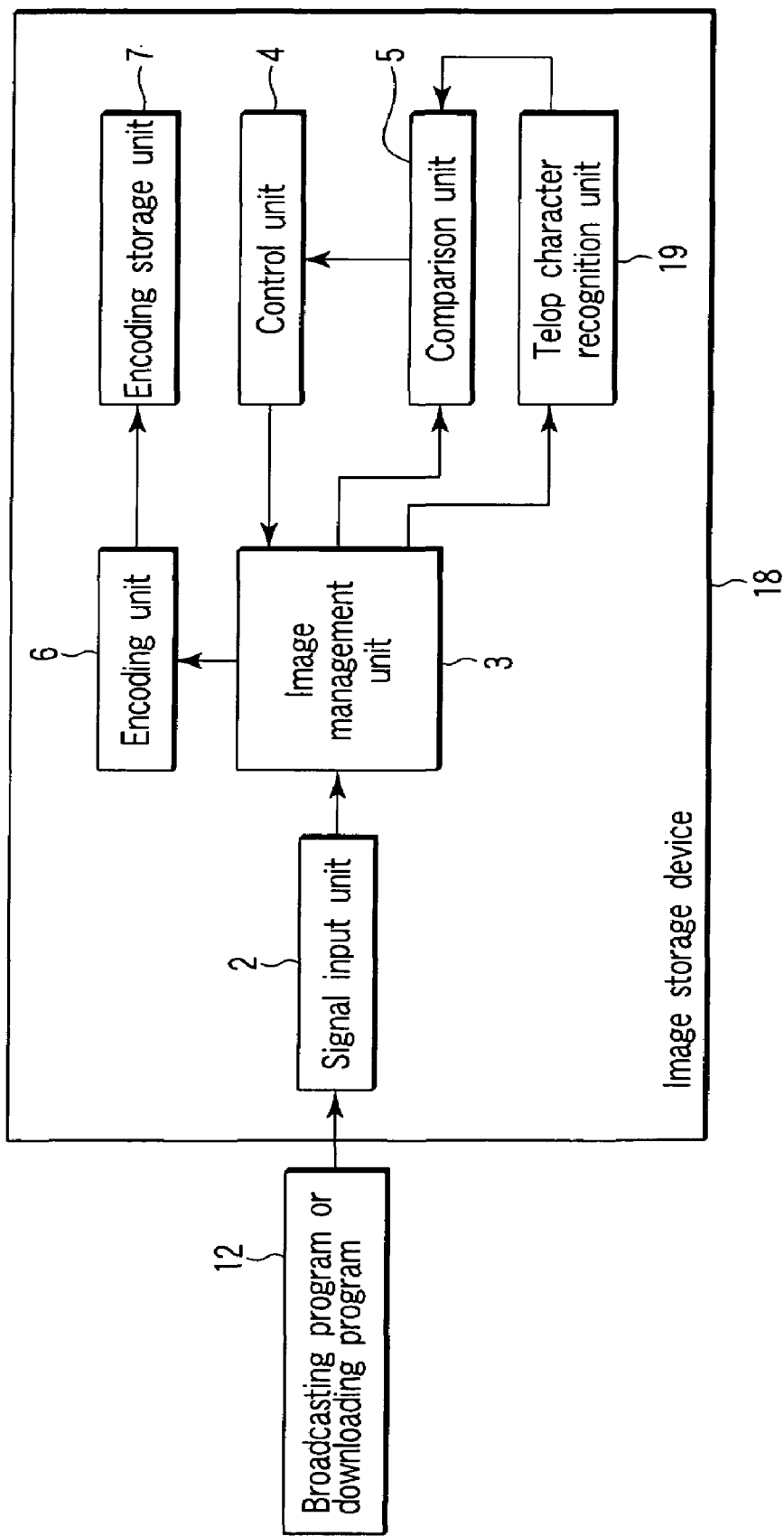
FIG. 9 is a block diagram showing an example of an image storage device according to the seventh embodiment.

FIG. 9 is a block diagram showing an example of an image storage device according to the present embodiment.

A telop character recognition unit 19 of an image storage device 18 according to the present embodiment performs a telop character recognition process and informs a comparison unit 5 of a telop character region. For a specific technique for telop character recognition, for example, a technique described in Jpn. Pat. Appln. KOKAI Publication No. 2000-182053 ("Video Processing Method and Device and Storage Medium Having Stored therein Video Processing Steps", Osamu Hori, Toshiba Corporation) can be used. For example, the telop character recognition unit 19 recognizes keywords such as "Replay", "Slow motion", "Record", "Video", and "CM" and determines a predetermined region including such keywords as a telop character region.

Parallel comparison units 101 to 10n of the comparison unit 5 each perform a frame image comparison/determination process excluding the telop character region informed by the telop character recognition unit 19.

A specific process of the telop character recognition unit 19 and the comparison unit 5 will be described below.

The telop character recognition unit 19 recognizes, as a telop character region, a region in which telop characters are likely to be inserted, such as a top, bottom, left, or right region of a frame image.

In addition, the telop character recognition unit 19 detects, by image processing, the shape and location of, for example, a band region where character information or the like is displayed, and recognizes the detected region as a telop character region.

The comparison unit 5 calculates the image similarity excluding the telop character region.

Here, a first example of the process of detecting the shape and location of a band region by the telop character recognition unit 19 will be described.

The telop character recognition unit 19 applies an edge filter to the entire frame image and generates profile data for an edge strength in X and Y directions.

A line of an edge of the band region is considered to be a line in either the X or Y direction. Thus, the telop character recognition unit 19 determines whether there is a very high peak in the X or Y direction edge profile and detects the line of the edge of the band region.

Now, a second example of the process of detecting the shape and location of a band region by the telop character recognition unit 19 will be described.

The telop character recognition unit 19 creates a color histogram of a frame image and creates profile data for a color histogram in X and Y directions.

In the band region, a color and a brightness are processed and a specific color (e.g., black) tends to be the predominant color of a background. Hence, the telop character recognition unit 19 checks the profile of the color histogram of the frame image and recognizes, as a telop character region, a region whose brightness or color saturation is lower than that of other regions.

In the present embodiment, the accuracy of telop character recognition does not need to be so high, and if a frame image has a possibility of being replay data the frame image is actively stored. This prevents the user from missing a highlight scene and thus is advantageous for the user.

For example, even if excessive amount of telop characters are detected to select a replay data from video image data of all channels for 24 hours, user satisfaction does not decrease much.

Figure 10:
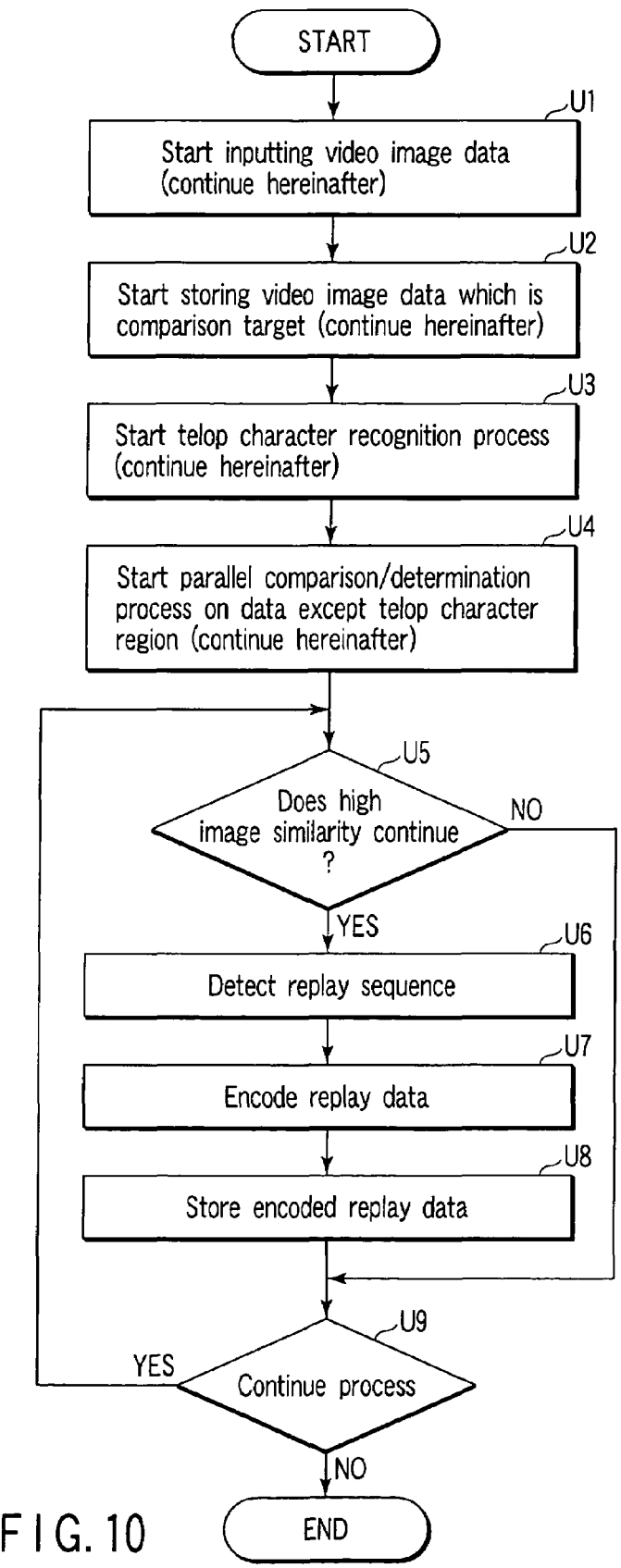
FIG. 10 is a flowchart showing an example of a schematic process of the image storage device according to the seventh embodiment.

FIG. 10 is a flowchart showing an example of a schematic process of the image storage device 18 according to the present embodiment.

Steps U1 and U2 are the same as the steps S1 and S2 of FIG. 3.

In step U3, the telop character recognition unit 19 starts a telop character recognition process on latest video image data and past video image data. The telop character recognition process continues until the process ends.

In step U4, the parallel comparison units 101 to 10n start a parallel comparison/determination process on the latest video image data except a telop character region and the past video image data except a telop character region. The parallel comparison/determination process continues until the process ends.

Steps U5 to U9 are the same as the steps S4 to S8 of FIG. 3.

In the above-described present embodiment, it is possible to prevent the detection and storage of replay data from being adversely affected by telop characters.

In the present embodiment, based on content of a portion of data recognized as a telop character region, a determination as to whether a frame image which is a comparison target is replay data may be made. This may allow to detect a highlight scene which is taken by cameras from different view points.

Eighth Embodiment

In the present embodiment, the case of detecting a still scene with no change between a frame image and a subsequent frame image of video image data will be described.

In the present embodiment, the parallel comparison units 101 to 10n recognize a still scene, such as a color bar, in which the same frame image continues one after another in video image data.

The image similarity of a still scene is uniformly high over a plurality of frame images. Thus, it is difficult to specify which frame image of past video image data corresponds to which frame image of latest video image data.

Hence, to eliminate such a still scene, the parallel comparison units 101 to 10n perform a frame image comparison process on condition that there is a temporal change between a frame image and an immediately preceding frame image.

For another technique, when there is no change between a frame image and a subsequent frame image, the control unit 4 may cancel (ignore) a difference in time information.

There may be a case in which telop characters are added to a still scene. In this case, as described in the foregoing seventh embodiment, the parallel comparison units 101 to 10n remove a telop character region and then perform a comparison process on a frame image having a change from an immediately before frame image after telop characters are removed.

In the above-described present embodiment, it is possible to prevent a still scene from being detected as a highlight scene.

Ninth Embodiment

In the present embodiment, the case of counting the number of inclusions of a portion corresponding to replay data in past video image data will be described.

Although the present embodiment describes the case in which the image storage device according to the first embodiment is provided with a counter unit and a counter storage unit, the image storage devices according to the second to eighth embodiments can also be similarly provided with a counter unit and a counter storage unit.

Figure 11:
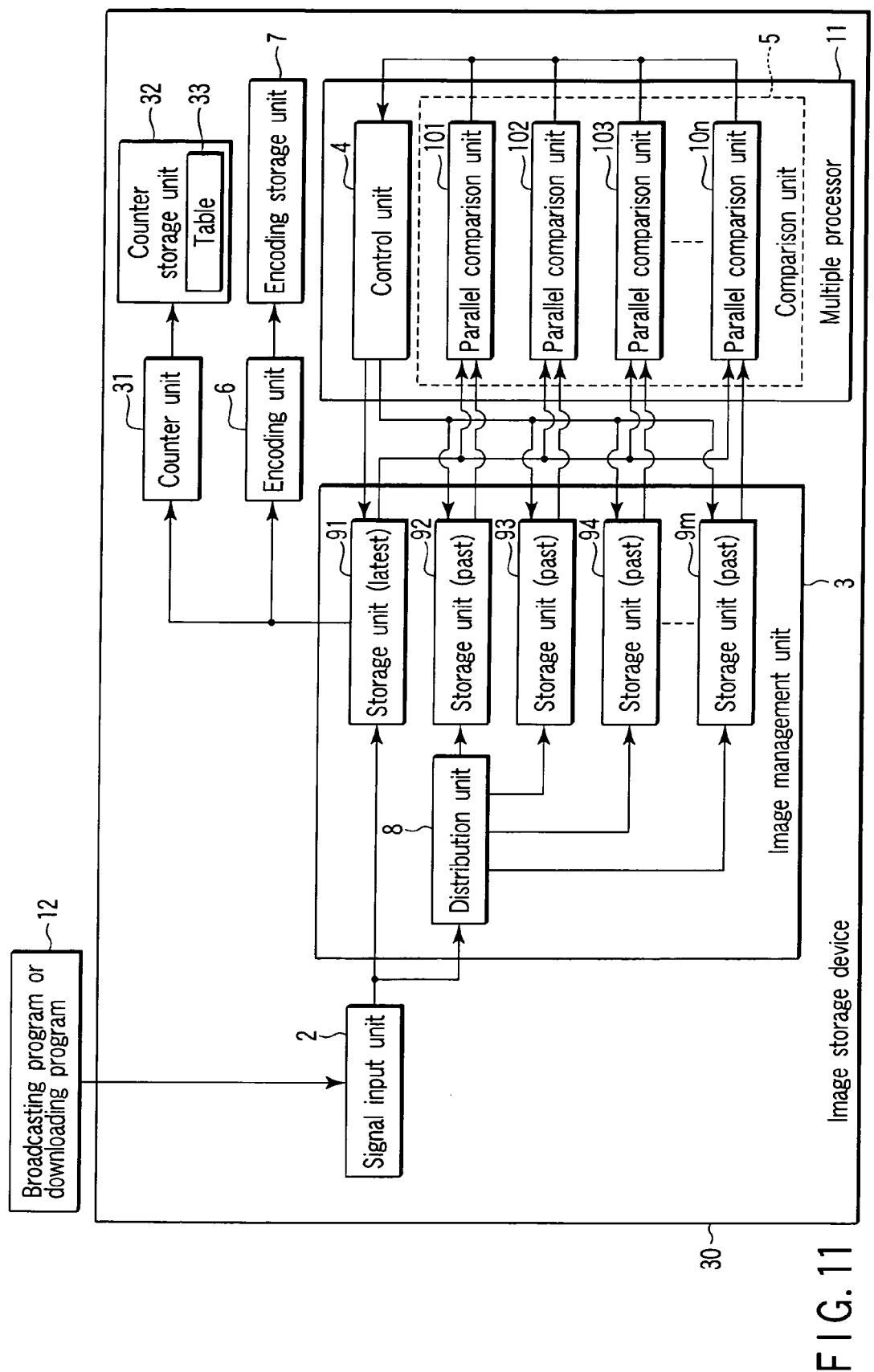
FIG. 11 is a block diagram showing an example of an image storage device according to the ninth embodiment.

FIG. 11 is a block diagram showing an example of an image storage device according to the present embodiment.

A counter 31 of an image storage device 30 receives replay data from a storage unit 91 and stores the identification number, thumbnail, and number of replays of the replay data in a table 33 of a counter storage unit 32.

The thumbnail is not encoded and can be used, as it is, as a frame image of video image data. Thus, the thumbnail is stored in the counter storage unit 32 such that the thumbnail can be checked against not only a start frame image of a replay scene but also the replay data.

For example, the thumbnail is data obtained by reducing the size of a frame image of replay data and performing a reducing process in a time direction. The thumbnail may be created by compressing the color information or brightness information of a frame image of replay data.

By storing such a thumbnail that is created by compressing the amount of information in the counter storage unit 32, the number of thumbnails stored can be increased. By storing a thumbnail, even when an image management unit 3 adopts a FIFO system and stores video image data for a finite time, the number of overlapping replay data units can be counted.

The replay data is checked against a thumbnail in the table. The counter unit 31 performs a comparison/determination process between the replay data and the thumbnail. As a result, when the image similarity between the replay data and the thumbnail is greater than or equal to a predetermined level, the counter unit 31 counts up the number of replays and stores the number of replays in the counter storage unit 32.

Figure 12:
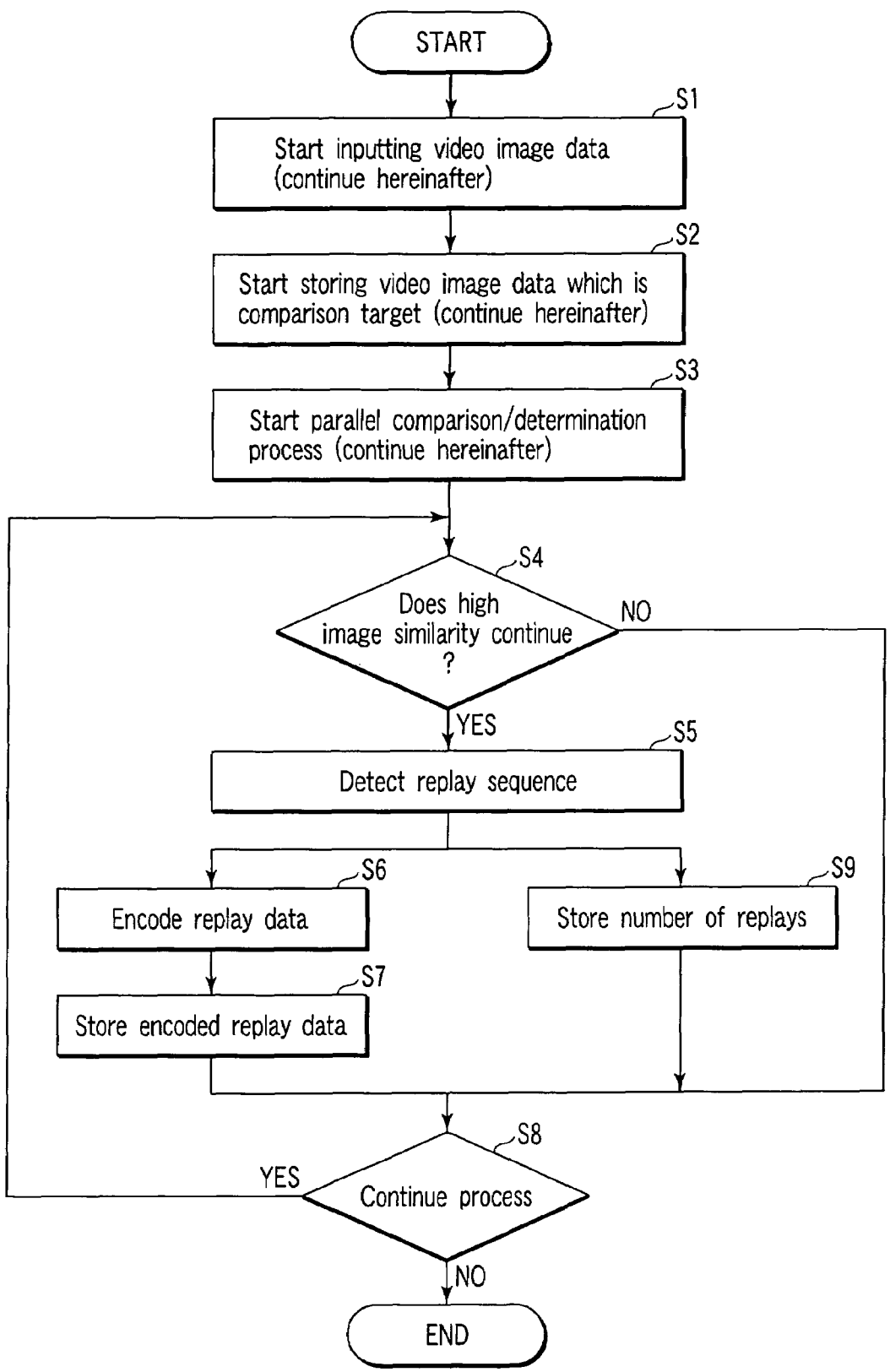
FIG. 12 is a flowchart showing an example of a schematic process of the image storage device according to the ninth embodiment.

FIG. 12 is a flowchart showing an example of a schematic process of the image storage device according to the present embodiment.

After a replay sequence is detected, in step S9, the counter unit 31 stores in the counter storage unit 32 the number of replays.

According to the present embodiment, for example, it is possible to display how many times certain replay data has been replayed today.

Information about the number of replays of replay data such as the one described above is very useful as information to be inputted to a system that edits video content. For example, as in the present embodiment, by counting the number of replays, the user can view "today's highlight scenes" or "headline news" in descending order of the number of replays and in descending order of importance. The user can promptly check topics and fashion in the world.

Note that when the number of replays is counted in a sequence of the time length of video image data storable in the storage units 91 to 9m, a thumbnail does not need to be created. On the other hand, when the number of replays is counted in a sequence wider than the time length of video image data storable in the storage units 91 to 9m, a thumbnail or the like is stored so that replay data can be checked.

As described in the present embodiment or the third embodiment, by counting the number of replays, user convenience can be enhanced. For example, in baseball broadcasting, almost all pitcher's pitches are replayed. Even in such a case, by user setting, for example, by storing only replay data whose number of replays is two or more, only replay data for a real highlight scene which is replayed twice or more can be stored.

Tenth Embodiment

In the present embodiment, an image storage device that encodes not only replay data but also other data will be described.

Although the present embodiment describes the case of encoding various data of the image storage device according to the first embodiment, the same can be performed in the image storage devices according to the second to eighth embodiments.

An image storage device according to the present embodiment encodes not only replay data but also, for example, all video image data and sound data inputted to the image storage device and stores the encoded data.

In addition, the image storage device detects replay data in parallel with the process of encoding all inputted video image data and sound data.

The inputted and encoded video image data and sound data except replay data are deleted in order from data that has been present over a certain period of time (e.g., 12 hours) and that is not specified by the user as a program to be stored.

When there is enough processing performance, e.g., when the encoding unit is composed of expert hardware, as in the present embodiment, all inputted video image data and sound data can be encoded and stored.

Eleventh Embodiment

In the present embodiment, an image storage device that divides video image data and searches for a start frame image of a replay sequence will be described.

Although the present embodiment describes the case in which the image storage device according to the first embodiment divides video image data and searches for a start frame image of a replay sequence, the same can be applied to the image storage devices according to the second to eighth embodiments.

A technique of searching for a start frame image of a replay sequence according to the present embodiment is particularly suitable for use in a multiple processor.

In the present embodiment, by latest dividing video image data and performing a comparison process between the divided latest video image data and past video image data, the workload and processing time are reduced.

Figure 13:
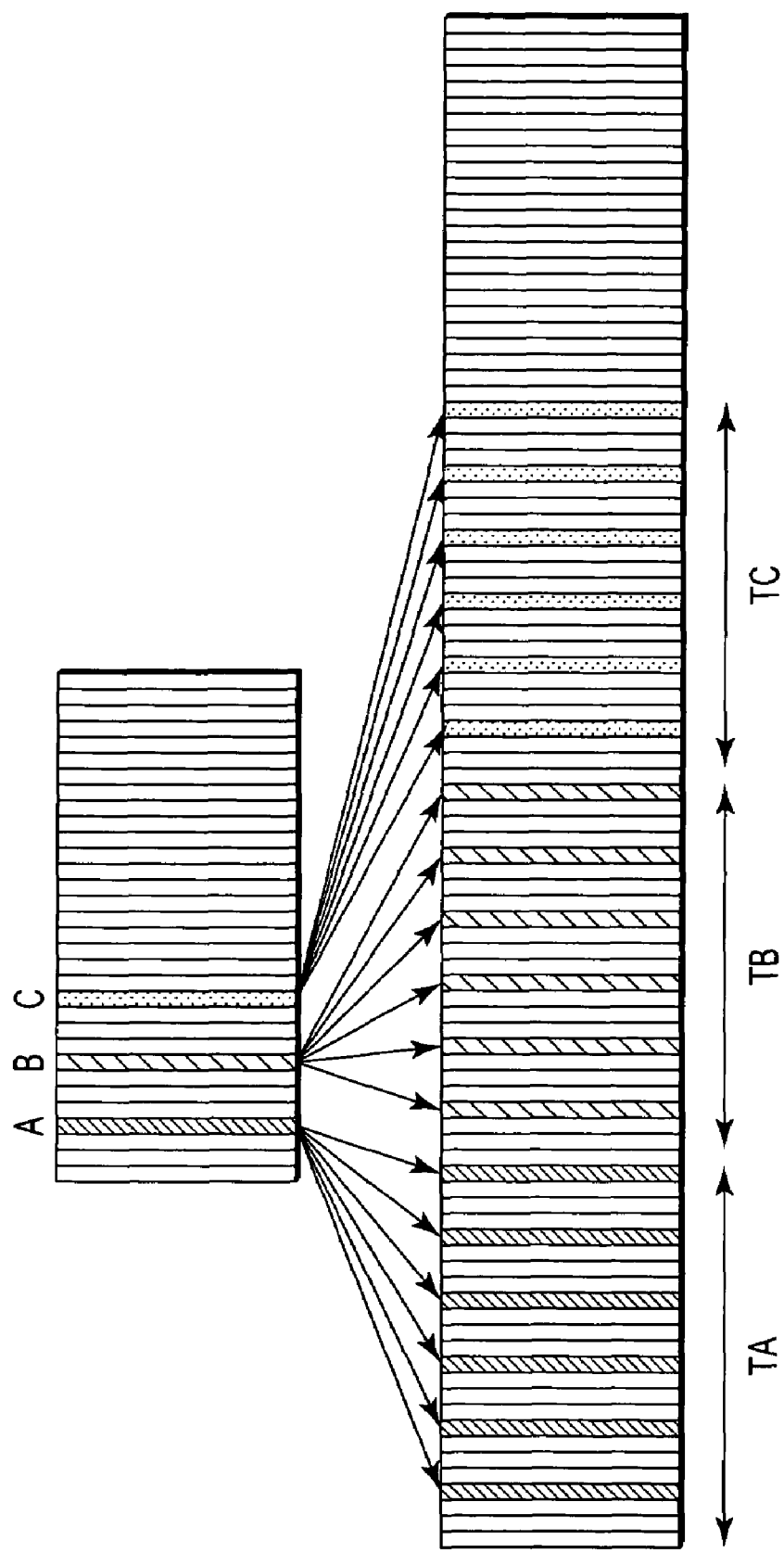
FIG. 13 is a diagram showing an example of a comparison process according to the eleventh embodiment.

FIG. 13 is a diagram showing an example of comparison process according to the present embodiment.

A frame image A of latest video image data is compared with frame images of past video image data in a time period TA. Similarly, frame images B and C of the latest video image data are compared with frame images of the past video image data in time periods TB and TC, respectively. In the present embodiment, a comparison of the frame images A to C of the latest video image data with the frame images of the past video image data in the time periods TA to TC is made in parallel. In addition, in the present embodiment, the frame images of the past video image data in the time periods TA to TC are sampled.

In the present embodiment, comparison targets for the frame images A to C have different time periods TA to TC and thus the load in the comparison process can be distributed.

Note that in FIG. 13 the case is exemplified in which six frame images belonging to each of the time periods TA to TC are the comparison targets for the frame images A to C of the latest video image data; however, the number of frame images, which are the comparison targets, for each time period is adjustable within a sequence that allows for a real-time process.

In the comparison process of FIG. 13, the time periods to which frame images to be compared with the frame images A to C belong are the same. Specifically, a first parallel comparison unit continuously performs a comparison six times between the frame image A and six frame images belonging to the time period TA. A second parallel comparison unit continuously performs a comparison six times between the frame image B and six frame images belonging to the time period TB. A third parallel comparison unit continuously performs a comparison six times between the frame image C and six frame images belonging to the time period TC.

However, in place of the comparison process of FIG. 13, the first to third parallel comparison units may perform a comparison while sequentially switching between the time periods to which frame images to be compared with the frame images A to C belong.

In the present embodiment, by dividing past video image data by the time periods TA to TC, it may become difficult to detect a frame image with a high image similarity. Such a problem can be solved by setting a predetermined level for image similarity to a low value.

Twelfth Embodiment

In the present embodiment, an image storage device in which there is no one-to-one correspondence between a storage unit and a parallel comparison unit will be described.

In the above-described embodiments, parallel comparison units are provided so as to correspond to storage units which are arranged in parallel, respectively.

On the other hand, in the present embodiment, a plurality of storage units are assigned to a single parallel comparison unit. The parallel comparison unit performs a comparison process for frame images stored in the plurality of storage units in a time-division manner.

Note that in the above-described embodiments, when a highlight scene is not in slow motion and is not a reduced-size scene with telop characters, a comparison process may be performed by dividing video image data into blocks and using a movement vector. A multiple processor is suitable for the calculation of the movement vector.

In addition, in the above-described embodiments, by generating pyramid image data and hierarchically comparing video image data, processing results can be stabilized and the workload of the image storage device can be reduced.

Thirteenth Embodiment

In the present embodiment, the case will be described in which each frame image or a pixel value total result of each frame image is divided into a plurality of blocks or portions, the blocks or portions are distributed to the parallel comparison units 101 to 10n, and a comparison process is performed in parallel.

For example, an image storage device divides each frame image which is a comparison target into 16 blocks and distributes the 16 blocks of the frame image to 16 parallel comparison units 101 to 10n. The 16 parallel comparison units 101 to 10n compare a pixel value within the divided frame image. Note that various configurations can be applied to a method of dividing each frame image and the number of divisions can also be freely set in view of appropriately performing a comparison process.

In addition, for example, the image storage device divides a pixel value total result (e.g., a histogram) of all frame images which are comparison targets into four portions and distributes the four portions of the pixel value total result to four parallel comparison units 101 to 10n. The parallel comparison units 101 to 10n compare the divided portions of the pixel value total result. By this, the load of the comparison process is reduced by ¼. Note that various configurations can be applied to a method of dividing a pixel value total result of each frame image and the number of divisions can also be freely set in view of appropriately performing a comparison process.

In addition, for example, the image storage device divides a frame image which is a comparison target into four blocks and distributes the four blocks of the frame image to four parallel comparison units 101 to 10n. The parallel comparison units 101 to 10n calculate a pixel value total result of each of the four blocks of the frame image and compare the results. By this, the load of the calculation of a pixel value total result can be reduced. Note that various configurations can be applied to a method of dividing each frame image and the number of divisions can also be freely set in view of appropriately performing a comparison process.

The above-described embodiments can be realized by freely combining any of the embodiments. In the above-described embodiments, the arrangement of the components may be changed as long as the components can perform the same operations, the components may be freely combined, each of the components may be freely divided, and some of the components may be eliminated. That is, the embodiments of the present invention are not limited to the above-described configurations, and in an actual application of the invention the components can be embodied by modifications without departing from the spirit and scope of the invention.

For example, the distribution unit 8, the encoding unit 6, the speed changing units 171 to 17k, the telop character recognition unit 19, and the counter unit 31 may be implemented by processors included in the multiple processor 11.

What is claimed is:

1. An image storage device comprising:
   a first storage unit which stores first image data;
   a second storage unit which stores second image data to be determined whether the second image data includes detection target data which is the same as or similar to data included in the first image data;
   a plurality of parallel comparison units which perform a process of comparing at least one of pixel values and pixel value total results between a frame image of the first image data and a frame image of the second image data in parallel, and determining, based on a comparison result between the frame image of the first image data and the frame image of the second image data, whether the detection target data is included in the second image data; and
   a third storage unit which stores, when it is determined that the detection target data is included in the second image data, the detection target data or data obtained by encoding the detection target data.

2. The image storage device according to claim 1, wherein
   the first storage unit stores first sound data for the first image data,
   the second storage unit stores second sound data for the second image data,
   the plurality of parallel comparison units compare the first sound data with the second sound data and determine in parallel, based on the comparison result between the frame image of the first image data and the frame image of the second image data and a comparison result between the first sound data and the second sound data, whether the detection target data is included in the second image data, and
   the third storage unit stores, when it is determined that the detection target data is included in the second image data, sound data for the detection target data or data obtained by encoding the sound data for the detection target data.

3. The image storage device according to claim 1, wherein the pixel value total results are at least one of a color histogram and a brightness histogram.

4. The image storage device according to claim 1, wherein the plurality of parallel comparison units are a plurality of processors included in a multiple processor.

5. The image storage device according to claim 1, wherein
   the first image data and the second image data are video image data or encoded data of a video image,
   the detection target data is replay data,
   the first storage unit sequentially stores the first image data,
   the second storage unit sequentially stores the second image data,
   the plurality of parallel comparison units perform a process of receiving from the second storage unit image data which is a replay determination target, receiving from the first storage unit image data of an arbitrary time, and comparing the image data which is the replay determination target with the image data of the arbitrary time, and determining, based on a comparison result, whether an image similarity between the image data which is the determination target and the image data of the arbitrary time is greater than or equal to a predetermined level in parallel, the image storage device further comprises:

a control unit which controls to provide the image data of the arbitrary time stored in the first storage unit to the plurality of parallel comparison units and detects a replay sequence based on a result determined by the plurality of parallel comparison units that the image similarity is greater than or equal to the predetermined level; and an encoding unit which performs an encoding process on the replay data which is image data of the replay sequence detected by the control unit, and the third storage unit stores the replay data encoded by the encoding unit.

6. The image storage device according to claim 5, wherein the first storage unit sequentially stores sound data for the first image data, the second storage unit sequentially stores sound data for the second image data, the plurality of parallel comparison units perform a process of receiving from the second storage unit first sound data for the image data which is the replay determination target, receiving from the first storage unit second sound data for the image data of the arbitrary time, comparing the first sound data with the second sound data, and determining whether a sound similarity between the first sound data and the second sound data is lower than or equal to a predetermined level in parallel, the control unit controls to provide the first sound data stored in the first storage unit to the plurality of parallel comparison units and detects, when it is determined by the plurality of parallel comparison units that the image similarity is greater than or equal to the predetermined level and the sound similarity is lower than or equal to the predetermined level, a replay sequence based on a determination result by the plurality of parallel comparison units, the encoding unit performs an encoding process on sound data for the replay data detected by the control unit, and the third storage unit stores the replay data and the sound data which are encoded by the encoding unit.

7. The image storage device according to claim 1, wherein the first storage unit includes a plurality of fourth storage units, one of the plurality of fourth storage units stores some frame images of the first image data, other one of the plurality of fourth storage units stores other frame images of the first image data, and the plurality of parallel comparison units compare at least one of pixel values and pixel value total results between the some frame images of the first image data and the frame image of the second image data and between the other frame images of the first image data and the frame image of the second image data in parallel.

8. The image storage device according to claim 1, wherein the first storage unit includes a plurality of fourth storage units, one of the plurality of fourth storage units stores the first image data, other one of the plurality of fourth storage units stores speed changed data obtained by changing a replay speed of the first image data, and the plurality of parallel comparison units compare at least one of pixel values and pixel value total results between the frame image of the first image data and the frame image of the second image data and between the speed changed data and the frame image of the second image data in parallel.

9. The image storage device according to claim 8, further comprising a speed changing unit which generates the speed changed data by inserting in the first image data a number of frame images according to a changed replay speed.

10. The image storage device according to claim 1, wherein at least one of the plurality of parallel comparison units compares the frame image of the first image data or a region of the frame image of the first image data with a region of the frame image of the second image data.

11. The image storage device according to claim 1, wherein the plurality of parallel comparison units compress an amount of information on the first image data and the second image data and then compare the first image data whose amount of information is compressed with the second image data whose amount of information is compressed.

12. The image storage device according to claim 1, further comprising a counter unit which counts the number of times a determination is made that the detection target data is included in the second image data.

13. The image storage device according to claim 1, wherein the control unit detects commercial data based on a time length of the detection target data.

14. An image storage method comprising:

storing a first image data in a first storage unit and storing in a second storage unit second image data to be determined whether the second image data includes detection target data which is the same as or similar to data included in the first image data;

performing in parallel, by a plurality of parallel comparison units, a process of comparing at least one of pixel values and pixel value total results between a frame image of the first image data and a frame image of the second image data, and determining, based on a comparison result between the frame image of the first image data and the frame image of the second image data, whether the detection target data is included in the second image data; and storing, when it is determined that the detection target data is included in the second image data, the detection target data or data obtained by encoding the detection target data, in a third storage unit.

15. The image storage method according to claim 14, wherein the first storage unit stores first sound data for the first image data, the second storage unit stores second sound data for the second image data, the plurality of parallel comparison units perform a process of comparing the first sound data with the second sound data and determining, based on the comparison result between the frame image of the first image data and the frame image of the second image data and a comparison result between the first sound data and the second sound data, whether the detection target data is included in the second image data in parallel, and the third storage unit stores, when it is determined that the detection target data is included in the second image data, sound data for the detection target data or data obtained by encoding the sound data for the detection target data.

16. The image storage method according to claim 14, wherein
the first storage unit includes a plurality of fourth storage units,
one of the plurality of fourth storage units stores some frame images of the first image data,
other one of the plurality of fourth storage units stores other frame images of the first image data, and
the plurality of parallel comparison units compare at least one of pixel values and pixel value total results between the some frame images of the first image data and the frame image of the second image data and between the other frame images of the first image data and the frame image of the second image data in parallel.

17. The image storage method according to claim 14, wherein
the first storage unit includes a plurality of fourth storage units,
one of the plurality of fourth storage units stores the first image data,
other one of the plurality of fourth storage units stores speed changed data obtained by changing a replay speed of the first image data, and
the plurality of parallel comparison units compare at least one of pixel values and pixel value total results between the frame image of the first image data and the frame image of the second image data and between the speed changed data and the frame image of the second image data in parallel.

18. The image storage method according to claim 14, wherein at least one of the plurality of parallel comparison units compares the frame image of the first image data or a region of the frame image of the first image data with a region of the frame image of the second image data.

19. The image storage method according to claim 14, further comprising:
compressing an amount of information on the first image data and the second image data and then comparing, by the plurality of parallel comparison units, the first image data whose amount of information is compressed with the second image data whose amount of information is compressed.

20. The image storage method according to claim 14, further comprising:
counting, by a counter unit, the number of times a determination is made that the detection target data is included in the second image data.

* * * * *